United States Patent
Bai et al.

(10) Patent No.: US 11,328,392 B2
(45) Date of Patent: May 10, 2022

(54) INPAINTING VIA AN ENCODING AND DECODING NETWORK

(71) Applicant: SAMSUNG ELECTRONICS CO., LTD., Suwon-si (KR)

(72) Inventors: Mengmeng Bai, Beijing (CN); Li Zuo, Beijing (CN); Xiansong Song, Beijing (CN); Jaekeun Na, Suwon-si (KR); Changwei Wang, Beijing (CN); Weihua Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/017,177

(22) Filed: Sep. 10, 2020

(65) Prior Publication Data

US 2021/0125313 A1 Apr. 29, 2021

(30) Foreign Application Priority Data

Oct. 25, 2019 (CN) .......................... 201911024819.0
Nov. 14, 2019 (CN) .......................... 201911115137.0

(51) Int. Cl.
*G06T 5/00* (2006.01)
*G06K 9/62* (2022.01)

(52) U.S. Cl.
CPC .............. *G06T 5/005* (2013.01); *G06K 9/629* (2013.01); *G06K 9/6272* (2013.01); *G06K 9/6289* (2013.01); *G06T 5/004* (2013.01)

(58) Field of Classification Search
CPC ....... G06T 5/004; G06T 5/005; G06K 9/6272; G06K 9/6289; G06K 9/629
See application file for complete search history.

(56) References Cited

U.S. PATENT DOCUMENTS

| 8,233,739 B1 | 7/2012 | Cho et al. |
| 9,135,732 B2 | 9/2015 | Winn et al. |
| 10,026,206 B2 | 7/2018 | Zhang et al. |
| 2009/0096808 A1 | 4/2009 | Winn et al. |
| 2012/0251013 A1* | 10/2012 | Porikli ............... H03M 7/30 382/233 |
| 2013/0182184 A1* | 7/2013 | Senlet ............... H04N 5/272 348/586 |

(Continued)

FOREIGN PATENT DOCUMENTS

EP 3 438 920 A1 2/2019

OTHER PUBLICATIONS

Olaf Ronneberger et al. "U-Net: Convolutional Networks for Biomedical Image Segmentation" retrieved from arXiv:1505.04597v1 [cs.CV], May 18, 2015, (8 pages total).

(Continued)

*Primary Examiner* — Casey L Kretzer
(74) *Attorney, Agent, or Firm* — Sughrue Mion, PLLC

(57) ABSTRACT

An image processing apparatus including: at least one memory; and at least one processor coupled to the at least one memory and configured to implement: an image acquisition module configured to acquire an input image including an object region; a mask image generation module configured to generate a mask image based on the input image; and an image inpainting module configured to extract a fusion feature map corresponding to the input image using an encoding network according to the input image and the mask image, and to inpaint the object region in the input image using a decoding network based on the fusion feature map, to obtain an inpainting result.

20 Claims, 33 Drawing Sheets

(56) References Cited

U.S. PATENT DOCUMENTS

| | | | |
|---|---|---|---|
| 2018/0129899 A1* | 5/2018 | Harron | G06K 9/4628 |
| 2018/0322366 A1 | 11/2018 | Lim et al. | |
| 2019/0138851 A1 | 5/2019 | Gray et al. | |
| 2019/0197673 A1 | 6/2019 | Jung et al. | |
| 2019/0311223 A1 | 10/2019 | Wang et al. | |
| 2019/0355102 A1* | 11/2019 | Lin | G06T 5/005 |
| 2020/0184098 A1* | 6/2020 | Andrasick | G06K 9/6271 |
| 2020/0327675 A1* | 10/2020 | Lin | G06T 7/194 |

OTHER PUBLICATIONS

Guilin Liu et al. "Image Inpainting for Irregular Holes Using Partial Convolutions" retrieved from arXiv:1804.07723v2 [cs.CV], Dec. 15, 2018, (23 pages total).

Jiahui Yu et al. "Free-Form Image Inpainting with Gated Convolution" retrieved from conarXiv:1806.03589v2 [cs.CV], Oct. 22, 2019, (17 pages total).

Connelly Barnes et al. "PatchMatch: A Randomized Correspondence Algorithm for Structural Image Editing" ACM Transactions on Graphics, Aug. 2009, (2 pages total).

Shaoqing Ren et al. "Faster R-CNN: Towards Real-Time Object Detection with Region Proposal Networks" retrieved from arXiv:1506.01497v3 [cs.CV], Jan. 6, 2016, (14 pages ).

Guilin Liu et al., "Image Inpainting for Irregular Holes Using Partial Convolutions", ECCV2018, arXiv:1804.07723v1, Apr. 20, 2018, Retrieved from: <URL: https://arxiv.org/pdf/1804.07723vl.pdf>. (23 pages total).

International Search Report (PCT/ISA/210) and Written Opinion (PCT/ISA/237) dated Dec. 15, 2020 issued by the International Searching Authority in International Application No. PCT/KR2020/011724.

\* cited by examiner

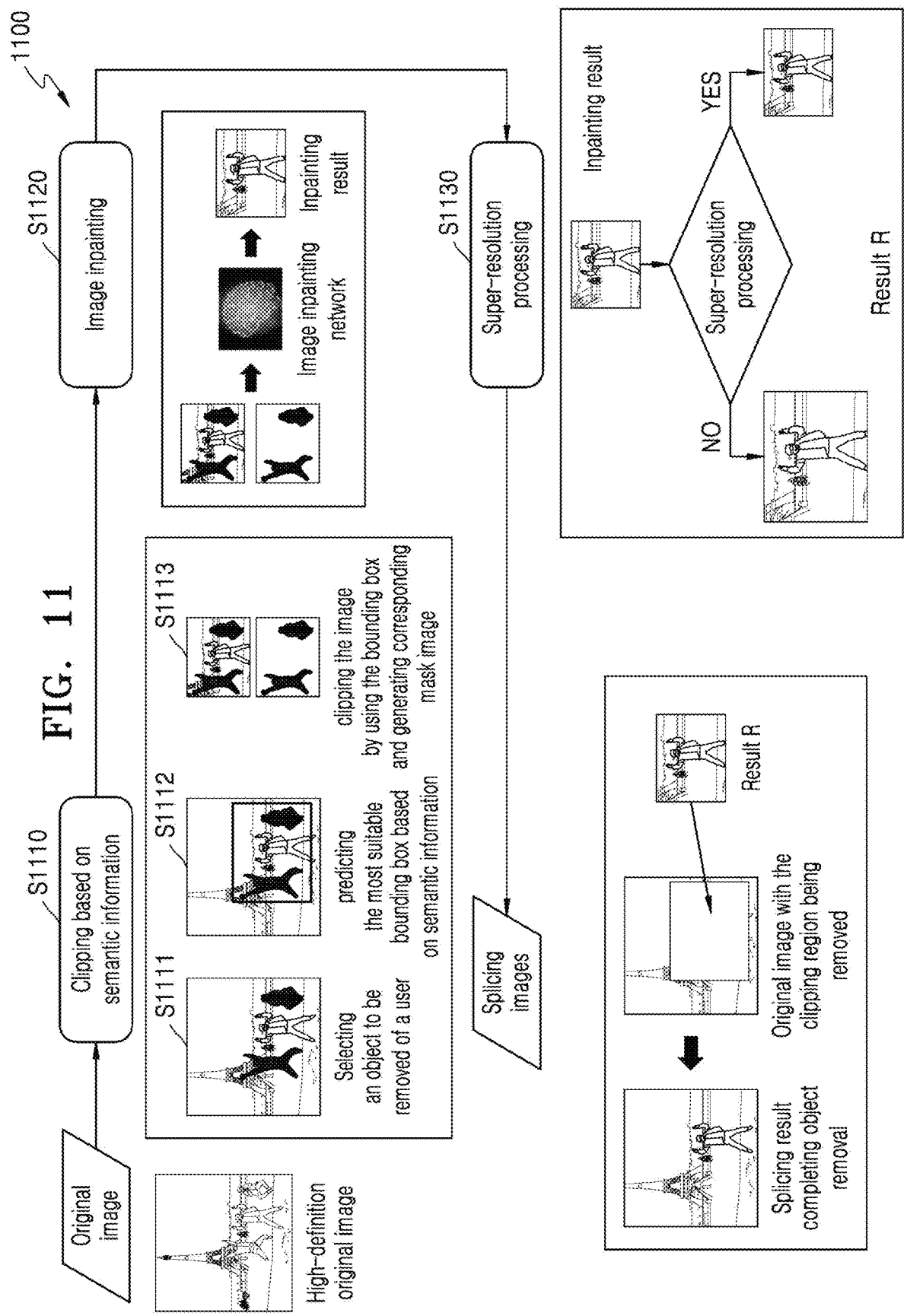

Gated convolution

Partial convolution

Depth Gated convolution

Gated convolution

Partial convolution

Depth Gated convolution

INPAINTING VIA AN ENCODING AND DECODING NETWORK

CROSS-REFERENCE TO RELATED APPLICATIONS

This application is based on and claims priority under 35 U.S.C. § 119 to Chinese Patent Application No. 201911024819.0, filed on Oct. 25, 2019, and Chinese Patent Application No. 201911115137.0, filed on Nov. 14, 2019 in the China National Intellectual Property Administration, the disclosure of which is incorporated by reference herein in its entirety.

BACKGROUND

1. Field

The present disclosure relates to the technical field of image processing, in particular to an image processing method, an apparatus, an electronic device and a computer readable storage medium.

2. Description of Related Art

By using the image object removal technology, things, people or other objects in an image can be automatically removed and filled with background information. For example, when a user takes an image and there are some objects in the image background, the user can remove the objects from the background by using the image object removal technology (such as removing other people except of the user himself from the image), and for example, the user can also remove objects such as "spots" and "moles" in the user's face image from the face image by using the image object removal technology.

The image object removal technology may be based on image inpainting technology. The object removal from the image may be achieved by taking the region to be removed as the image lost region and using the image inpainting technology to reconstruct the image lost region with background information. The conventional image inpainting technologies can be divided into two types: the traditional image processing method and the learning-based processing method. However, the inpainting effects of the conventional image inpainting technologies are not ideal and may be improved.

SUMMARY

Provided are methods, apparatuses, and computer-readable media for correcting the image inpainting effect.

Additional aspects will be set forth in part in the description which follows and, in part, will be apparent from the description, or may be learned by practice of the presented embodiments.

In accordance with an aspect of the disclosure, an image processing apparatus includes at least one memory; and at least one processor coupled to the at least one memory and configured to implement: an image acquisition module configured to acquire an input image including an object region; a mask image generation module configured to generate a mask image based on the input image; and an image inpainting module configured to extract a fusion feature map corresponding to the input image using an encoding network according to the input image and the mask image, and to inpaint the object region in the input image using a decoding network based on the fusion feature map, to obtain an inpainting result.

The encoding network and the decoding network may include at least one first convolution processor, and the at least one first convolution processor may be configured to perform convolution according to an input fusion feature map and outputs the fusion feature map obtained by the convolution.

The encoding network may further include at least one second convolution processor cascaded with a last first convolution processor of the encoding network, and the at least one second convolution processor may be configured to perform dilated convolution according to the input fusion feature map, and output the fusion feature map obtained by the dilated convolution.

The at least one second convolution processor may include a first-second convolution processor and a second-second convolution processor, the first-second convolution processor may be cascaded in sequence with the second-second convolution processor, and a first convolution parameter of the first-second convolution processor may be different from a second convolution parameter of the second-second convolution processor.

The input fusion feature map may be based on a plurality of channels, and the at least one first convolution processor may be further configured to: perform first convolution according to the input fusion feature map to extract a corresponding image feature map; perform second convolution based on the input fusion feature map to extract a mask feature map based on at least one channel, wherein a number of the at least one channel is smaller than a number of the plurality of channels; fuse the image feature map and the mask feature map; and output a result of the fusing.

Before the performing the second convolution, the at least one first convolution processor may be further configured to, based on the number of the at least one channel being different from the number of the plurality of channels, convert the input fusion feature map into a converted fusion feature map based on the at least one channel, and the second convolution may be performed based on the converted feature map.

The at least one first convolution processor may be further configured to: perform processing according to at least two convolution processing parameters, and extract feature maps corresponding to at least two receptive fields, based on the input fusion feature map; and fuse the extracted feature maps corresponding to the at least two receptive fields to obtain the mask feature map.

The image inpainting module may be further configured to: obtain a preliminary inpainting result based on the input image and the mask image; generate a noise image having a same size as the input image; and obtain the inpainting result based on the preliminary inpainting result and the noise image.

The image inpainting module may be further configured to process an object map by at least one of randomly exchanging element values of element points in adjacent locations in the object map, and randomly adjusting the element values of the element points in the object map, wherein the object map may include at least one of the fusion feature map and the inpainting result.

The randomly exchanging may include: performing a first edge clipping on the object map to obtain a first clipped map and a second edge clipping on the object map to obtain a second clipped map; generating a first weight map corresponding to the first clipped map and a second weight map corresponding to the second clipped map, wherein element values of element points in the first weight map and the second weight map are one of 1 or 0, and wherein a first element value of a first element point at a first position of the first weight map is different from a second element value of a second element point at a second position of the second weight map corresponding to the first position; and fusing the first clipped map and the second clipped map based on the first weight map and the second weight map to obtain a processed map having a same size as the object map.

The randomly adjusting may include: performing a third edge clipping on the object map to obtain a third clipped map and a fourth edge clipping on the object map to obtain a fourth clipped map; performing feature extraction based on the third clipped map to obtain an adjustment coefficient of the fourth clipped map; and adjusting element values of element points in the fourth clipped map based on the adjustment coefficient to obtain a processed object map with the same size as the object map.

The image acquisition module may be further configured to: acquire an original image including the object region; extract image features of the original image; and perform clipping on the original image based on the image features of the original image to obtain the input image including the object region.

The image acquisition module may be further configured to: determine a region size of the object region; based on the region size being smaller than or equal to a threshold size, obtain candidate regions having a first set region size according to the image features of the original image and location information of the object region; based on the region size being larger than the threshold size, obtain candidate regions having a second set region size according to the image features of the original image and the location information of the object region; screen the object region from candidate regions; and based on the screened object region being a candidate region having the second set region size, clip the original image according to the screened object region to obtain a clipped image having the second set region size, and scaling the clipped image according to the first set region size to obtain the input image, and the image inpainting module may be further configured to: scale the inpainting result to obtain a scaled inpainting result having the second set region size; and fuse the scaled inpainting result and the original image to obtain an inpainting result corresponding to the original image.

In accordance with an aspect of the disclosure, an image processing method includes acquiring an input image including an object region; generating a mask image based on the input image; and extracting a fusion feature map corresponding to the input image through an encoding network according to the input image and the mask image, and inpainting the object region in the input image using a decoding network based on the fusion feature map to obtain an inpainting result.

The encoding network and the decoding network may include at least one first convolution processor, and the at least one first convolution processor may perform convolution according to an input fusion feature map and outputs the fusion feature map obtained by the convolution.

The inpainting may include obtaining a preliminary inpainting result based on the input image and the mask image; generating a noise image having a same size as the input image; and obtaining the inpainting result based on the preliminary inpainting result and the noise image.

The method may further include processing an object map by at least one of: randomly exchanging element values of element points in adjacent locations in the object map, and randomly adjusting the element values of the element points in the object map, and the object map may include at least one of the fusion feature map and the inpainting result.

The acquiring the input image may include acquiring an original image including the object region; extracting image features of the original image; and performing clipping on the original image based on the image features of the original image to obtain the input image including the object region.

The clipping may include determining a region size of the object region; based on the region size being smaller than or equal to a threshold size, obtaining candidate regions having a first set region size according to the image features of the original image and location information of the object region; based on the region size being larger than the threshold size, obtaining candidate regions having a second set region size according to the image features of the original image and the location information of the object region; screening the object region from candidate regions; and based on the screened object region being a candidate region having the second set region size, clipping the original image according to the screened object region to obtain a clipped image having the second set region size, and scaling the clipped image according to the first set region size to obtain the input image, and after the obtaining the inpainting result, the method may further include scaling the inpainting result to obtain a scaled inpainting result having the second set region size; and fusing the scaled inpainting result and the original image to obtain an inpainting result corresponding to the original image.

In accordance with an aspect of the disclosure, a non-transitory computer readable storage medium is configured to store instructions which, when executed by at least one processor, cause the at least one processor to: acquire an input image including an object region; generate a mask image based on the input image; extract a fusion feature map corresponding to the input image using an encoding network according to the input image and the mask image; and inpaint the object region in the input image using a decoding network based on the fusion feature map, to obtain an inpainting result.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates a flowchart of an image processing method according to an embodiment.

DETAILED DESCRIPTION

Figure 1:
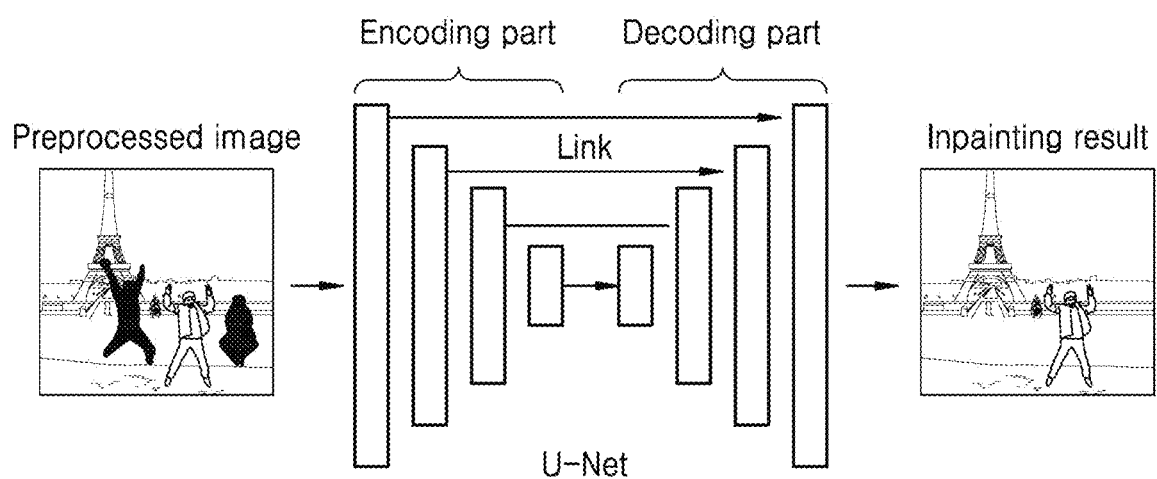
FIG. 1 illustrates a schematic principle diagram of performing image inpainting based on a conventional U-net structure according to an embodiment.

Embodiments may relate to solving at least one of the technical defects discussed above, especially the technical defect that the image inpainting effect is not ideal.

An embodiment may relate to an image processing method, the method including: acquiring an image to be processed including an object region to be removed; generating a mask image of the image to be processed; extracting a fusion feature map corresponding to the image to be processed through an encoding network according to the image to be processed and the mask image; and inpainting the object region to be removed in the image to be processed through a decoding network based on the fusion feature map, to obtain an inpainting result inpainting result.

An embodiment may relate to an image processing apparatus, the apparatus including: an image acquisition module configured to acquire an image to be processed including an object region to be removed; a mask image generation module configured to generate a mask image of the image to be processed; and an image inpainting module configured to extract a fusion feature map corresponding to the image to be processed through an encoding network according to the image to be processed and the mask image, and reconstruct the object region to be removed in the image to be processed through a decoding network based on the fusion feature map, to obtain an inpainting result.

An embodiment may relate to an electronic device including a memory and a processor. The memory may be configured to store a computer program, and the processor is configured to execute the method provided in the first aspect of the present application when running the computer program.

An embodiment may relate to a computer readable storage medium on which a computer program is stored, that is used for executing the method provided in the first aspect of the present application when executed by a processor.

The beneficial effects of the technical solution provided by the application will be described in detail in the following embodiments.

Embodiments of the present application are described in detail below, examples of which are illustrated in the accompanying drawings, wherein the same or similar reference numerals refer to the same or similar elements or elements having the same or similar functions throughout. The embodiments described below with reference to the accompanying drawings are exemplary and are only for the purpose of explaining the present application and are not to be construed as limiting the present invention.

Those skilled in the art will understand that the singular forms "a", "an", "said" and "the" as used herein may also include plural forms unless expressly stated. It should be further understood that the term "comprising" as used in the specification of this application refers to the presence of stated features, integers, steps, operations, elements and/or components, but does not preclude the presence or addition of one or more other features, integers, steps, operations, elements, components and/or groups thereof. It should be understood when we call an element "connected" or "coupled" to another element, it may be directly connected or coupled to the other element, or intervening elements may also be present. In addition, as used herein, "connected" or "coupled" may include a wireless connection or wireless coupling. As used herein, the phrase "and/or" includes all or any element and all combinations of one or more associated listed items.

Image object removal technology is implemented mainly based on the image inpainting technology. At present, conventional image inpainting technologies can be divided into two types: the traditional image processing method and the learning-based processing method.

The typical traditional image inpainting technology in the field of image inpainting is a PatchMatch algorithm, which is an algorithm that can quickly and effectively find two regions with high similarity in two images. Based on the PatchMatch algorithm, an image region similar to the lost region (i.e. the region to be removed) can be found from the non-lost region in the image, and then the found image region is filled into the lost region, thus realizing the image inpainting.

In the learning-based method, the image inpainting is mainly realized based on a deep learning network and a generative adversarial network. The method includes the following steps: after a user selects an object region to be removed from an original image (i.e., an image to be processed), the pixel value corresponding to the object region in the original image is set to 0 according to the object region to be removed selected by the user, and the pixel values of the preprocessed image are normalized from (0, 255) to (−1, 1); the preprocessed image is input to an image inpainting network, and an inference is performed by the image inpainting network using trained weight parameters; the object region to be removed of the image is reconstructed, and the inpainting result is output, so that the object removal is completed.

The conventional learning-based image inpainting technology is mainly realized based on a U-net (U-network) structure, and the image inpainting is realized by using a special convolution operation for image inpainting on the basis of it.

FIG. 1 illustrates a schematic diagram of a conventional U-net structure. As shown in FIG. 1, the U-net structure includes two parts: an encoding stage and a decoding stage. The encoding stage is mainly used to extract the feature map of the preprocessed image, i.e. the image to be processed. Specifically, information such as high-layer and low-layer semantics of the preprocessed image can be obtained. The decoding stage is used to perform an upsampling computation to obtain the inpainting result according to the information obtained in the encoding stage. For example, in an image inpainting task, a feature extraction is performed on an image in the U-net encoding stage, and an upsampling is performed by using the obtained image features in the decoding stage. A general image understandable by people is obtained from the feature map, and the result of image inpainting is output. Specifically, after selecting the object region to be removed from the original image to be processed, the user deletes the pixel value of the object region to be removed (i.e., the pixel value of the object region to be removed is set as 0) from the original image to obtain a preprocessed image. If the size of the preprocessed image is inconsistent with the size of the input image required by the network, the preprocessed image can be scaled to the size of the input image required by the network. Then, the encoding part, which may be referred to as an encoder performs the feature extraction on the input image, and the decoding part, which may be referred to as a decoder, performs the upsampling operation by using operations such as deconvolution, nearest neighbor interpolation-based or bilinear interpolation-based image scaling according to the features extracted by the encoding part, to reconstruct the object region to be removed in the image, so that the object removal of the image is realized.

In order to effectively reduce the loss of information during the image transfer, for the traditional U-net, a link, which can be a convolution operation, will be added between the feature maps with the same dimension in the encoding part and the decoding part. That is, a convolution operation is performed between the encoding layer and the decoding layer with the same dimension to ensure that the data transferred into the decoding part has low-dimensional features of the original image in addition to the extracted high-dimensional features.

For the traditional U-net, only a general convolution operation is used, and some special convolution operations specifically for image inpainting are not used. With the advent of various special convolution operations specifically for image inpainting, an improved U-net structure may be used based on the traditional U-net structure, such as a U-net based on partial convolution (Partial Cony) and a U-net based on gated convolution (Gated Cony).

Figure 2:
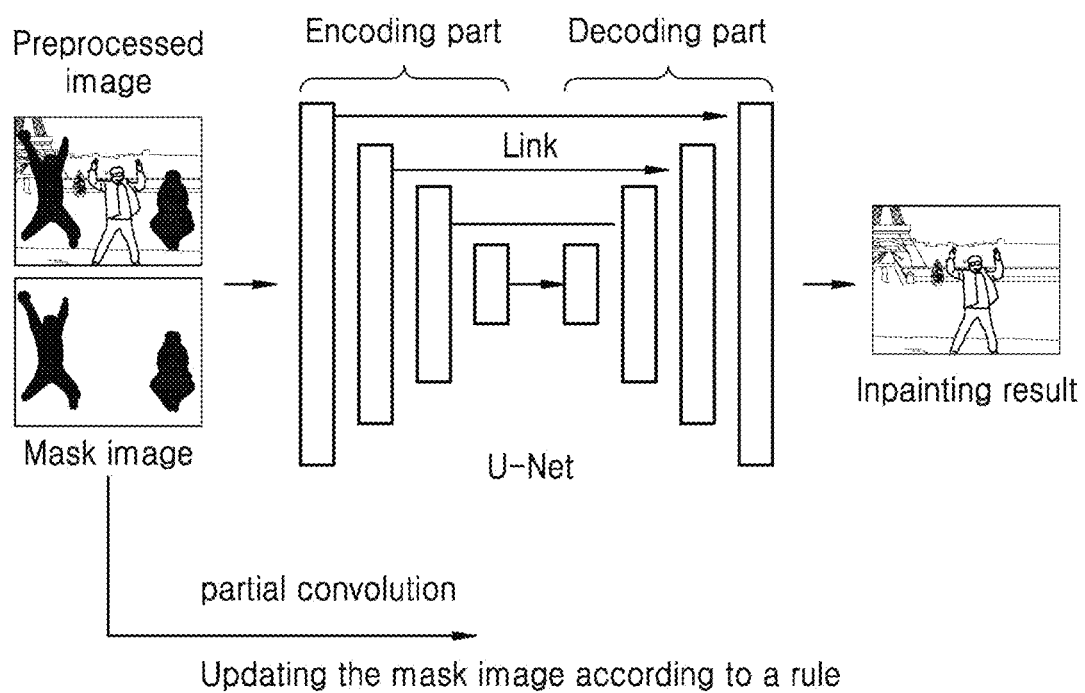
FIG. 2 illustrates a schematic principle diagram of performing image inpainting based on a conventional partial convolution-based U-net structure according to an embodiment.

FIG. 2 illustrates a U-net using partial convolution. As shown in the figure, the inputs into the image inpainting network are a preprocessed image with the pixel value of the object region to be removed being deleted and the mask image corresponding to the preprocessed image. The pixel values of the mask image only include 0 and 1, and the mask image and the preprocessed image have the same pixel size, wherein the pixel value corresponding to the object region to be removed is 0, and the pixel value of the remaining regions is 1. The image inpainting network uses the partial convolution operation according to the mask image, and only convolves some regions of the preprocessed image, for example by extracting its feature map, but does not convolve the regions of the preprocessed image that do not meet the rule requirements. Whether to convolve some regions of the preprocessed image is determined based on the mask image. The partial convolution-based U-net updates the mask image based on a customized mask image update rule. Compared with the traditional U-net network structure, the partial convolution-based U-net replaces a general convolution operation in the traditional U-net with a partial convolution operation, and the input data must include its corresponding mask image and the update rule of the mask image.

Figure 3:
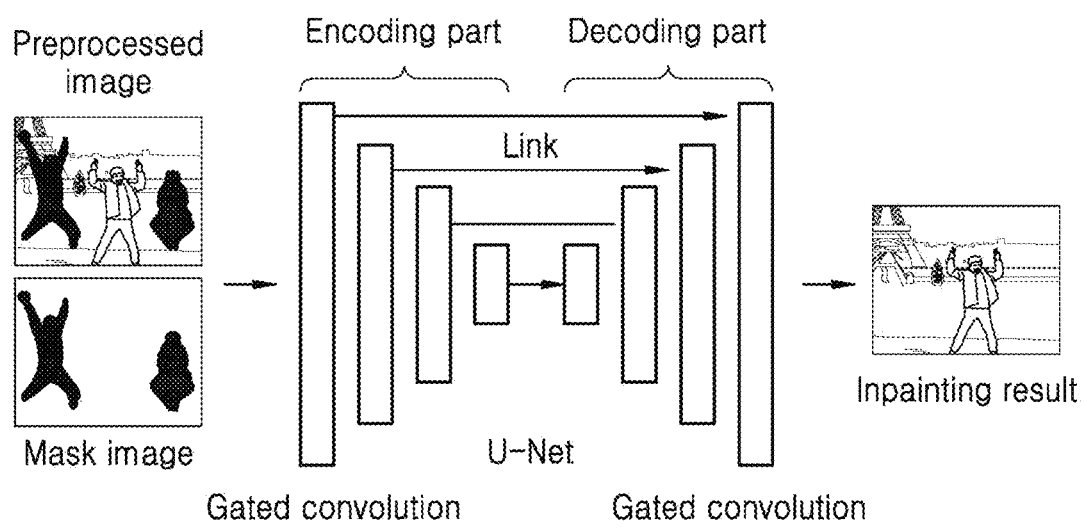
FIG. 3 illustrates a schematic principle diagram of performing image inpainting based on a conventional gated convolution-based U-net structure according to an embodiment.

The gated convolution is another kind of special convolution for image inpainting, which is based on partial convolution. FIG. 3 illustrates a gated convolution-based U-net structure. Compared with the structures shown in FIGS. 1 and 2, the gated convolution-based U-net structure replaces the general convolution in the traditional U-net structure with the gated convolution, and the inputs into the network are still the preprocessed image and its corresponding mask image. Compared with the partial convolution, the learning method used in the gated convolution changes the mask image update rule customized by the user to an update rule obtained based on the learning method. The data processing flow of the gated convolution-based U-net structure during image inpainting may generally begin by inputting the preprocessed image and the corresponding mask image. Then, in the encoding part of the U-net, the gated convolution updates the mask image while extracting the input data features, fuses the updated mask image with the extracted image features, and inputs it into the gated convolution of the next layer, until the end of the encoding part. Then, according to the data fused with the mask image and the feature map output by the encoding part, the decoding part uses the gated convolution again after adopting the upsampling operation to extract the feature map and update the mask image on the upsampled data, and outputs the data fused with the mask image and the feature map for the upsampling operation of the next layer. The previous step is then repeated until the U-net network forward inference ends.

Based on the gated convolution-based U-net structure, the gated convolution operation part includes two branch convolution operations: a feature extraction branch (feature map branch) and a mask image update branch (updated mask branch). The feature map extraction branch is mainly used for extracting features of input data, while the other branch updates the mask image according to the input data. Finally, a point multiplication is performed on the results of the two branches pixel by pixel.

Figure 4:
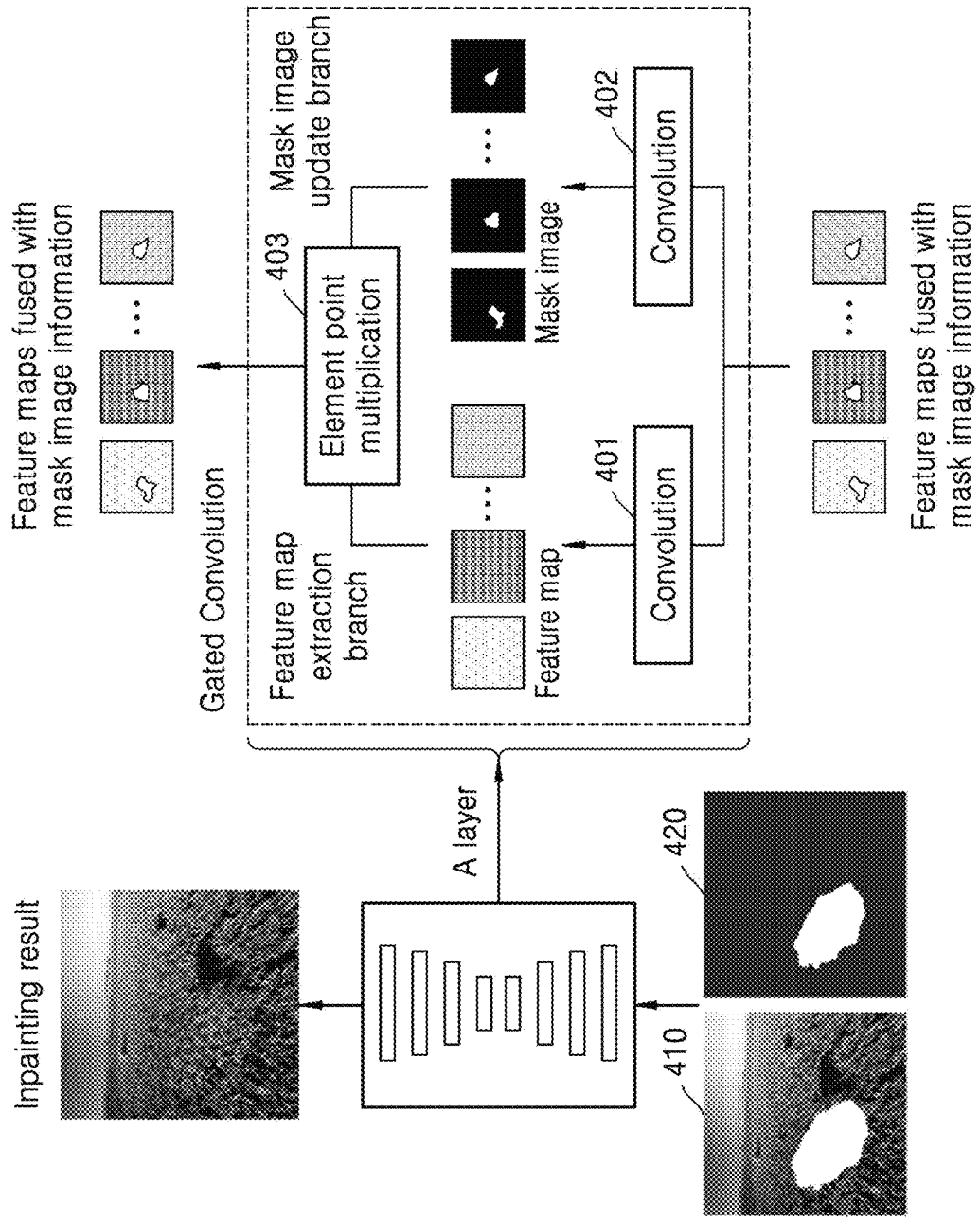
FIG. 4 illustrates a schematic principle diagram of extracting the feature map fused with mask image information based on a conventional gated convolution structure.

FIG. 4 illustrates a schematic principle diagram of a certain layer of gated convolution in FIG. 3 performing feature extraction and mask image update, wherein the data processing flow is from bottom to top, according to an embodiment. For the first layer of gated convolution, the inputs are the image to be processed 410 and the mask image 420 corresponding to the image to be processed 410. Based on the mask image 420 and the image to be processed 410, the first layer of gated convolution extracts the fusion feature map of the first layer. For each layer of gated convolution after the first layer of gated convolution, the input is the feature map fused with mask image information output by the previous layer of gated convolution.

As shown in FIG. 4, the input feature maps (feature maps shown in the figure respectively represent feature map data of different channels) fused with mask image information are input into a gated convolution structure, a feature map extraction branch 401 is used for extracting feature maps from the input data, and a new feature map is obtained from the input feature maps through a feature map extraction branch 401. The feature map extraction branch 401 is implemented by using a general convolution operation, and adding any activation function (such as a Leaky Rectified Linear Unit (Leaky ReLU) and a tan h (hyperbolic tangent) activation function) thereafter, to output the extracted feature map. A mask image update branch 402 also uses general convolution for operation, but the activation function added after the convolution is a sigmoid, i.e., the range of output values is [0, 1]. By setting the range of the output values of this branch as the range of mask image values of the partial convolution, the convolution operation can learn the update rules of the mask image during training, thus updating the mask image more reasonably. After that, a point multiplication 403 is performed on the results of the two branches pixel by pixel to output the final feature maps, that is, the output feature maps (corresponding to the feature maps fused with mask image information in the image).

Although conventional image inpainting technologies may realize the inpainting of the object region to be removed in the image, various problems may be improved in the conventional technologies:

For example, for the image inpainting solution based on the traditional image processing method, the image processing method according to this solution does not have the learnability, but only uses the distance between the image pixels as the standard for judging similarity, which will lead to the lack of contrast of semantic information, thus resulting in unreasonable semantic information of the inpainting region. In addition, the PatchMatch needs to generate a bounding box according to the size of the object region to be removed for sliding window scanning inpainting. When the object region to be removed is large, the generated bounding box is also large, and the region where the sliding window needs to slide is also large, thus increasing the data processing time. If it is necessary to increase the size of the sliding window in order to reduce the number of sliding times of the sliding window, the amount of computation of distance between the region to be filled for computing the size of the sliding window and the region for filling the sliding window in the image is increased, which makes the image inpainting time being proportional to the area of the object region to be removed, wherein the larger the region is, the longer the algorithm takes.

For the image inpainting solution based on the learning method, from the foregoing description, it can be seen that the U-net structure is the basic network architecture of the conventional image inpainting network, and most image inpainting networks are designed based on this network architecture. However, the U-net only uses general convolutions. When the area of the lost region in the image is large, the downsampling of general convolutions makes the corresponding feature map value of the obtained lost region being 0. Because the downsampling of general convolutions cannot obtain enough receptive field information, the inpainting result of image upsampling is poor, and many traces of manual inpainting and some un-reconstructed regions are likely to appear in the inpainting result. In addition, the input of the U-net is limited by the computational load, so if the input image pixels are very high, the computational overhead required is also very high and the processing time overhead is large. Therefore, in order to make the processing speed within an acceptable range, when directly using U-net to recover an image, it is necessary to scale the image from a high-definition image to an image with a low pixel size, and input the image with the low pixel into U-net for image inpainting, which results in low pixel of the inpainting image and poor inpainting effect.

For the improved U-net structure, such as the partial convolution-based U-net, a fixed mask image update rule may be set by a user, which makes the network to selectively extract the feature map according to the unique updated mask image for the feature data of different channels, thereby leading to unreasonable feature map extraction and "fish scale phenomenon" on the sampling results on the network. In addition, the manually customized mask image update rule lacks an adaptive mechanism. When the performance of network inpainting is desired to be improved in the case of the unreasonable definition of the mask image update rule, the inpainting effect may be improved by increasing the depth and width of the network, but at the same time the model size of the network will also increase.

Although the gated convolution-based U-net uses a learning method to learn the mask image update rule, all feature map data output from the previous layer are required for updating each mask image by the mask image update branch, during the process of implementing mask image update by the gated convolution using the convolution operation. This method uses a large amount of data, resulting in a large number of redundant convolution operations in the mask image update branch, further affecting the convolution kernel learning mask image update rule. Therefore, when the gated convolution performs feature extraction according to the mask image, it cannot learn which part of the features needs to be extracted and which part does not need to be extracted. Thus, the mechanism has two problems: on the one hand, some unnecessary convolution operations are added; on the other hand, too much redundant data input is not conducive to training convolution kernel weights, affects the network learning mask image update rule, and also causes the "fish scale phenomenon" in the final inpainting result.

Embodiments may provide an image processing method which may solve at least one of the above technical problems in conventional image inpainting technologies. In order to make the description of embodiments clearer, the following will first introduce and explain several terms involved in this application:

Image to be processed may refer to an image from which an object region to be removed, and a region in the image where the object to be removed is located may be referred to as an object region to be removed.

Mask image of the image to be processed may refer to an image being consistent with the image to be processed in image sizes, that is, being consistent with the image to be processed in number of pixels. Wherein, the pixel value corresponding to the object region to be removed in the mask image is 0, and the pixel value of the remaining regions is 1.

RPN (Region Proposal Network) may refer to a network being used to generate a candidate box (i.e., a candidate region) in an input image or input feature map. The output of the network usually includes two branches, one of which is the probabilities of the candidate region as an object region and a non-object region (the probability indicating whether a region can be used as a candidate region), and the other of which is the four parameters of the candidate region, which usually refer to the center coordinate of the region and the width and height of the region.

Embodiments will be described in detail below. The following several specific embodiments can be combined with each other, and the same or similar concepts or processes may not be repeated in some embodiments. Embodiments of the present application will be described below with reference to the accompanying drawings.

Figure 5:
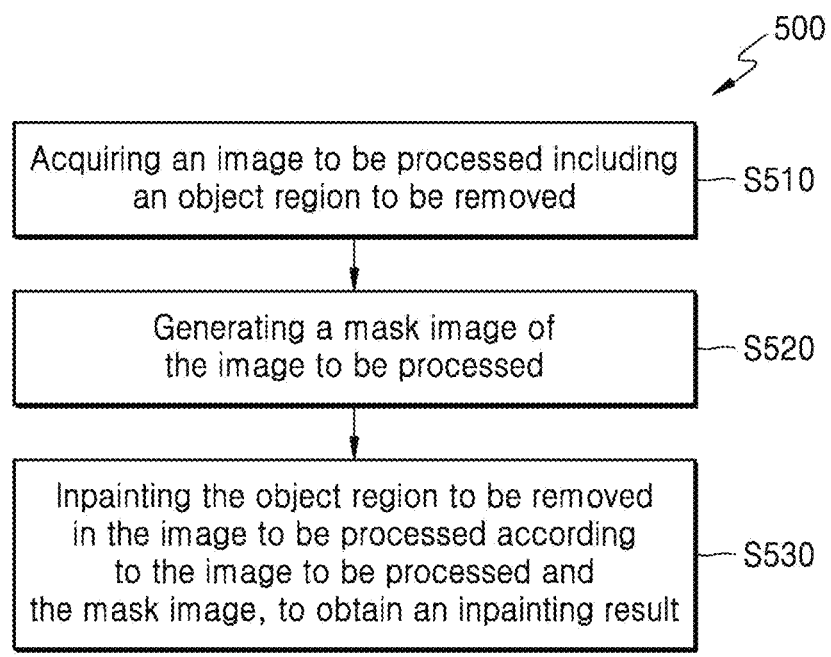
FIG. 5 illustrates a flowchart of an image processing method according to an embodiment.

FIG. 5 illustrates a flowchart of an image processing method 500 according to an embodiment of the present application. As shown in the figure, the method may include, at operation S510, acquiring an image to be processed including an object region to be removed. The object region to be removed may refer to the image region selected by the user to be removed and reconstructed. In embodiments, the user may open the image to be removed in the image inpainting software and select the region to be removed through the region selection tool of the software, at which time the region selected by the user is the object region to be removed.

At operation S520, the image processing method 500 may include generating a mask image of the image to be processed;

At operation S530, the image processing method 500 may include inpainting the object region to be removed in the image to be processed according to the image to be processed and the mask image, to obtain an inpainting result.

In an embodiment of the present application, the image to be processed may be an original image requiring object removal or may be an image after preprocessing the original image. In practical application, after selecting an object region to be removed from an original image, the user may preprocess the original image based on the selected object region. For example, the user may perform clipping on the original image to obtain the image to be processed including the object region to be processed, or perform further processing on the object region to be removed from the original image or the clipped image to obtain the image to be processed, such as setting the pixel value of the object region to be removed to 0.

In an embodiment of the present application, in step S510, the step of acquiring an image to be processed including an object region to be removed may include acquiring an original image including an object region to be removed; extracting image features of the original image; and performing clipping on the original image based on the image features of the original image to obtain the image to be processed including the object region to be removed.

In practical applications, if the pixels of the original image are very high, that is, the resolution of the original image is very high, the computational overhead required for image inpainting based on the original image is also very high, resulting in a large processing time overhead, that is, the time cost for processing high-definition images is very high. However, if the high-definition image is simply scaled to a low-pixel-size image for processing, it will lead to the inpainting result with lower pixels and a poor image inpainting effect. In addition, when the area of the image region to be reconstructed is large and the image is recovered based on the original image, in the conventional image inpainting solution, the problems, such as, many traces of manual inpainting, not capable inpainting of some regions, will occur in the inpainting.

In order to solve the above problems, an embodiment of the application performs clipping on the original image according to the image features of the original image before performing image inpainting, to realize the image clipping based on semantic information of the image, and subsequently performs inpainting of the region to be removed in the image based on the clipped image. Based on the solution, since the image inpainting is based on the clipped image, the problem of high latency processing high-definition images can be solved, wherein the clipping is based on image semantic information instead of directly scaling the original image. On the premise of ensuring high pixels of the image to be processed, the clipped image part to be processed can include as much information as possible which can be used for inpainting the object region to be removed, that is, as much useful information in the original image which can be used for image inpainting can be retained as possible, thus ensuring the inpainting effect of the image.

Through this solution, the processing of the original image may be converted into the processing of the local region of the original image, and the pixel information of the original image may be retained as much as possible. When the object region to be removed is small, the solution may basically completely retain the pixel information of the original image, and when the object region to be removed is large, the lost information of original image may be relatively limited, so that the inpainting effect of the object region to be removed can be ensured. When the image inpainting is performed through an image inpainting model, the pixel size input by the model can be effectively reduced and useful information may be retained as much as possible through the solution.

It should be noted that in the solution provided by the embodiment of the present application, the original image may be a high-definition image, for example an image with a resolution greater than a certain resolution, such as an image with a resolution greater than 1024*1024 pixels, or a non-high-definition image. That is, the image clipping solution according to the embodiment of the present application may be applicable to all types of images.

In an embodiment of the present application, the step of performing clipping on the original image based on the image features of the original image to obtain the image to be processed including the object region to be removed includes: determining candidate regions including the object region to be removed in the original image based on the image features of the original image; screening the object region from candidate regions; and performing clipping on the original image according to the screened object region to obtain the image to be processed including the object region to be removed.

In an embodiment, the solution may first obtain a plurality of candidate regions based on the image features of the object region to be removed and the original image, further screen the object region from the plurality of candidate regions based on the image features, and perform clipping on the original image based on the object region to obtain the image to be processed. Because each candidate region is also determined from the original image based on the image features, each candidate region may include more image information of the original image. On this basis, further screening may be performed on a plurality of candidate regions based on the image features of the original image, so as to obtain the most reasonable object region. That is, the object region that retains the most original image information may be screened out from the candidate regions that include more original image information, and the optimal image part to be processed may be clipped based on the object region.

In an embodiment, based on the image features of the object region to be removed and the original image, each candidate region including the object region to be removed in the original image may be determined by a neural network, such as an RPN.

In an embodiment of the present application, the step of determining candidate regions based on the image features of the original image may include: determining the region size of the object region to be removed; obtaining each candidate region with a first set region size according to the image features of the original image and the location information of the object region to be removed in the original image if the region size is not greater than a set threshold; and obtaining each candidate region with a second set region size according to the image features of the original image and the location information of the object region to be removed in the original image if the region size is greater than the set threshold.

The size of the object region to be removed may refer to the area of the object region to be removed. In the actual image processing, the object region to be removed selected by the user may be an irregular region. In the image processing, the size of the object region to be removed can be specifically the size of the minimum circumscribed rectangle of the object region to be removed.

According to an embodiment, an image clipping solution may be executed according to the region size of the object region to be removed, so that the clipped image to be processed may include more other image information for inpainting the region while including the object region to be removed. Based on the solution, the problem that the subsequent image inpainting effect is poor due to too little image information for inpainting the object region contained in the clipped image due to the fact that the actual size of the object region to be removed is not considered can be effectively avoided.

The first set region size and the second set region size may be configured according to actual application requirements.

Alternatively, the second set region size may be determined based on the first set region size, and the above set threshold may be determined based on the first set region size or may be set based on empirical values. The first set region size may be the size of an input image required by a subsequent image inpainting network. The size relationship between the first set region size and the second set region size may be not limited, that is, the second set region size may be smaller than the first set region size and the second set region size may be greater than the first set region size. In an embodiment, in order to make the acquired image to be processed include as much information as possible of the original image, the second set region size may be greater than the first set region size.

In an embodiment of the present application, the step of clipping the original image according to the screened object region to obtain an image to be processed if the screened object region is a candidate region with the second set region size includes: clipping the original image according to the screened object region to obtain a clipped image with the second set region size; and scaling the clipped image according to the first set region size to obtain the image to be processed including an object region to be removed.

Because image inpainting can be realized by a conventional image inpainting model and in order to make the input image sizes of the model consistent, the image to be processed with the second set region size may be scaled to the first set region size by scaling when the image to be processed with the second set region size is obtained. That is, the input image size of the model may be the first set region size. When the area of the object region to be removed is large and the second set region size is greater than the first set region size, the pixel size of the image to be processed may be further reduced, the data processing amount of the model may be reduced, and the image processing efficiency of the model may be improved, through the solution.

In an embodiment of the present application, if the above scaling processing is performed on the clipped image, after obtaining the inpainting result, the embodiment may further include performing a corresponding scaling processing on the inpainting result to obtain an inpainting result with a second set region size based on the scaling ratio at which the clipped image is scaled above; and performing fusion processing on the inpainting result after the scaling processing and the original image to obtain the inpainting result corresponding to the original image.

In practical application, in order to fuse the inpainting result with the original image after completing the inpainting of the object region to be removed in the image to be processed to obtain the inpainting result corresponding to the original image, the corresponding scaling processing (second scaling processing) needs to be performed again based on the scaling ratio of the scaling processing to process the size of the inpainting result to the size before the first scaling processing, if the image to be processed is an image after scaling processing (first scaling processing) the clipped image. Specifically, if the second set region size is greater than the first set region size, the first scaling processing may be a reduction processing and the second scaling processing may be an enlargement processing. On the contrary, if the second set region size is smaller than the first set region size, the first scaling processing may be an enlargement processing and the second scaling processing may be a reduction processing. Optionally, when the second set region size is smaller than the first set region size, the second scaling processing may specifically be a super-resolution processing, which restores the inpainting result to the image size before scaling.

In an embodiment, after obtaining the scaled inpainting result, that is, the image after the second scaling processing, the scaled image may be fused with the original image to obtain the inpainting result corresponding to the original image is not limited in this application. For example, the image after the second scaling processing may be spliced with other image parts in the original image except the image part to be processed to obtain an inpainting result corresponding to the original image, and some preprocessing may be performed on the edges of the two parts to be spliced during splicing to make the spliced edges smoother and more natural.

In order to better explain and understand the above image clipping solution based on semantic information provided by this application, the image clipping solution will be described in further detail below with a specific example.

In this example, the original image is a high-definition image (e.g., an image with a resolution greater than 1024*1024 pixels), the first set region size is n*n pixels, the second set region size is m*m pixels, and the set threshold value is k times the size of the first set region, where k<1. Specifically, in this example, the original image is an image of 2048*2048 pixels, n=512, k=0.3 and m=$\sqrt{n/k}$. In other words, the image area corresponding to the set threshold is 0.3 times the area of the image to be processed obtained after clipping.

Using a conventional depth learning-based algorithm, it may be difficult to process high-definition images quickly. If original high-definition images are directly input to the image inpainting network, it will require very large amount of computation resources, which will increase the time-consuming of inference process of the model, thus making the conventional depth learning algorithm slow in removing of high-definition image objects. In order to be able to quickly run the depth learning algorithm to process high definition images, the original image may be clipped according to the region to be removed, and the region similar to the missing part (object region to be removed) may be clipped from the original image and input to the image inpainting network as an input image instead of inputting the whole original image to the image inpainting network, i.e. image object removal may be performed by using the clipped image.

Figure 6:
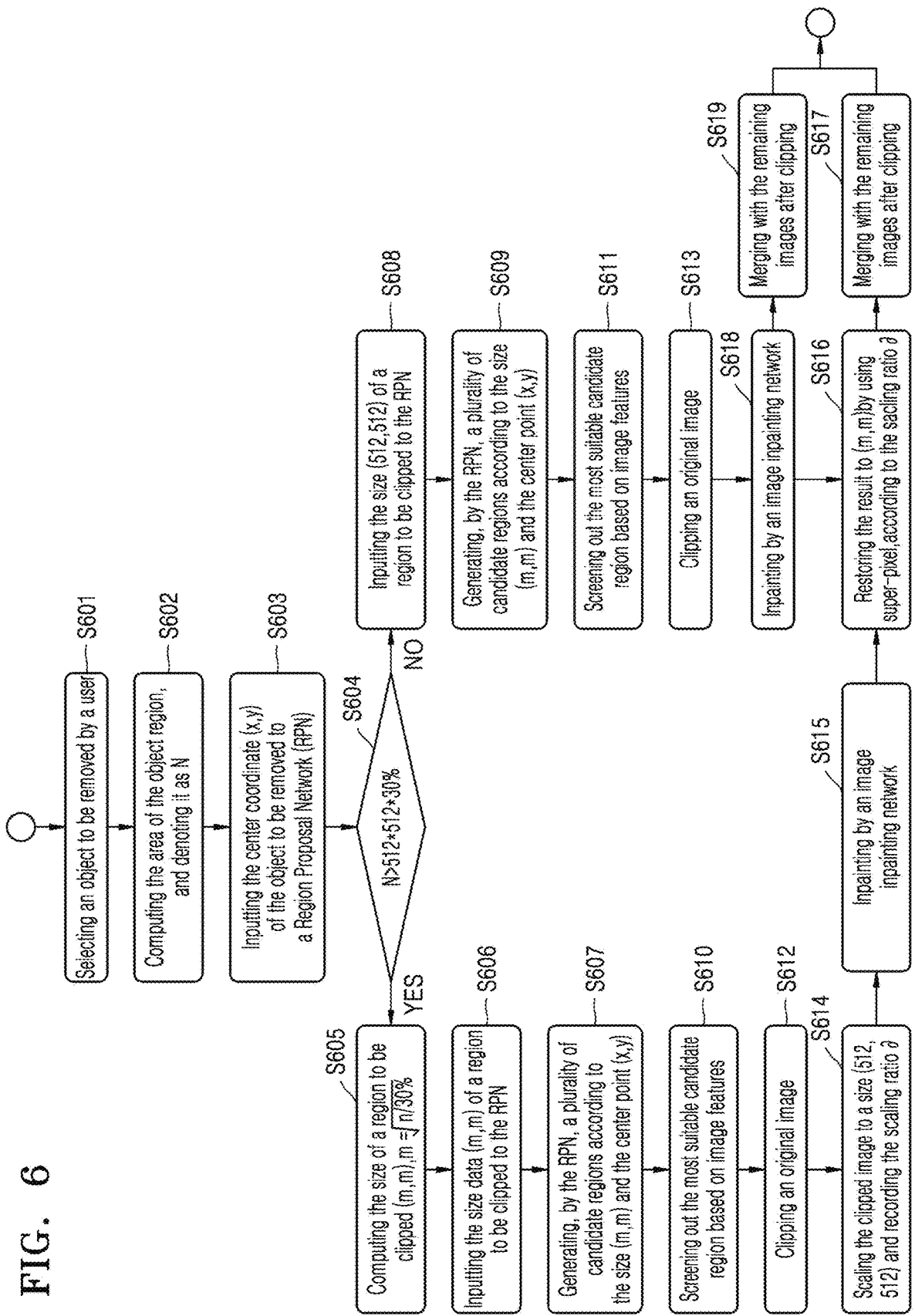
FIG. 6 illustrates a flowchart of performing image clipping based on semantic information according to an embodiment.
Figure 7:
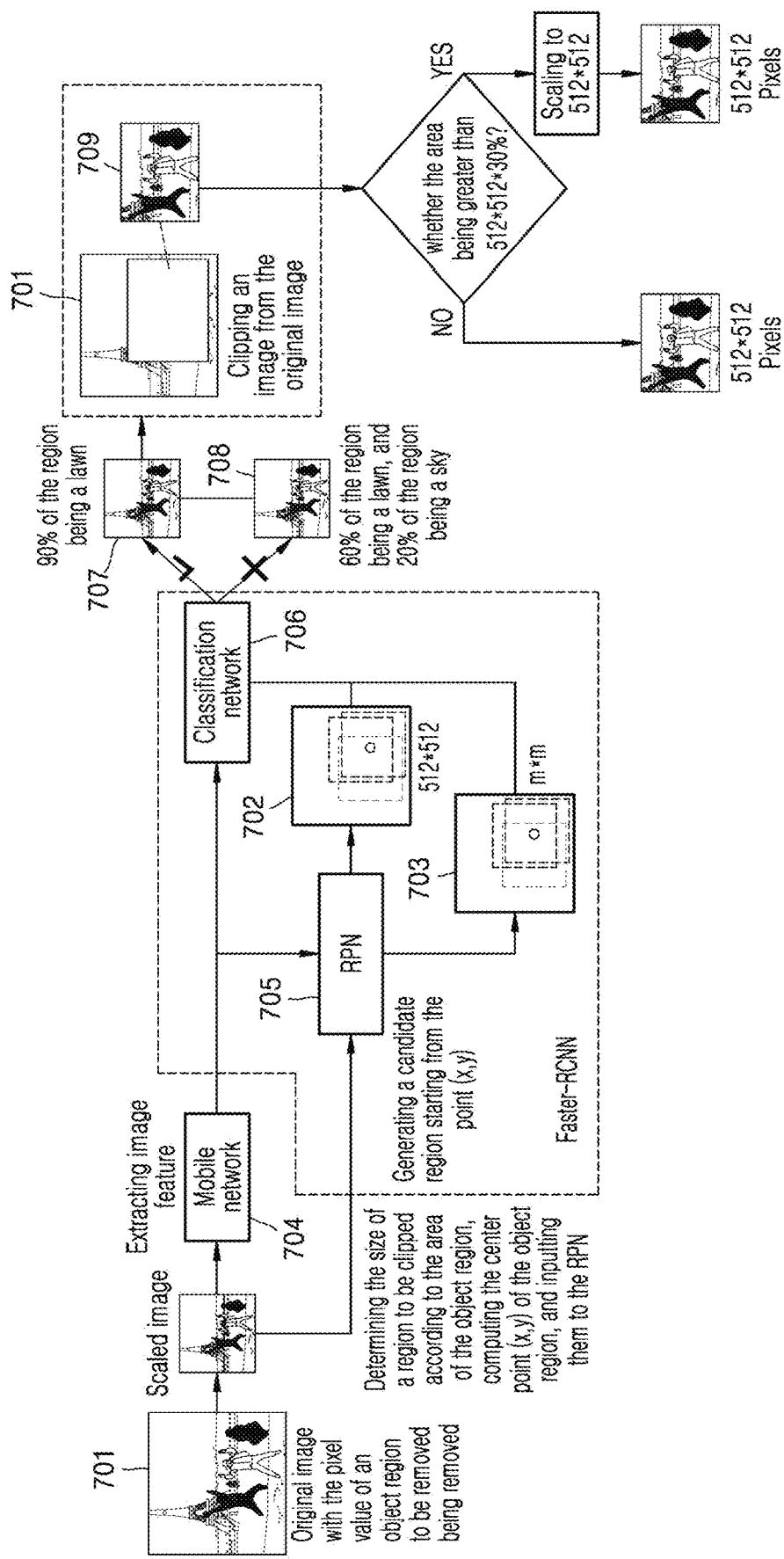
FIG. 7 illustrates a schematic principle diagram of performing image clipping based on semantic information according to an embodiment.

In this example, a high-definition image of 2048*2048 pixels may be specifically clipped into images of 512*512 pixels according to the region to be removed, and then image object removal may be performed on the clipped images. FIGS. 6 and 7 illustrate flow diagrams of a semantic information-based image clipping method according to an embodiment of the present application. In this example, each candidate rectangular region may be determined based on the image features of the original image, and an object region may be screened out from candidate regions, which can be specifically realized by Faster-RCNN (Regions with Convolutional Neural Network). In this example, as shown in FIG. 7, the Faster-RCNN may include an RPN and a classification network. In an embodiment of the clipping method in this example is as follows.

At operation S601, the user draws the region of the object to be removed, i.e. the object region to be removed on the high-definition image, which may be for example the original image. The object to be removed may also be referred to as the object to be removed or the object region, and then the region of the object to be removed in the high-definition image may be preprocessed, such as adjusting the pixel value of the object region to be removed to be 0 to obtain the preprocessed image (for example original image 701 shown in FIG. 7).

When extracting image features of high-definition image, the image features may be extracted based on the high-definition image before preprocessing, may be extracted based on the high-definition image after preprocessing, or may be extracted based on the scaled image after scaling the high-definition image before or after preprocessing. That is, after scaling the high-definition image to a low-pixel image, the feature extraction may be performed. For example, an image of 2048*2048 pixels may be scaled to an image of 512*512 pixels. Wherein, the extraction of image features may be realized through a neural network. For example, the feature map of the image (which can also be referred to as image features) may be extracted through a mobile network (mobile-net) and input into the RPN.

In order to determine the region size of the object region to be removed, i.e. the area of the object region to be removed, the center point of the object region to be removed, i.e. the center point coordinates (x, y) of the minimum circumscribed matrix, may be found out, for example in operation S602, according to the minimum circumscribed rectangle of the object region to be removed and input into the RPN at operation S603. As an example, operations S603 and S602 in FIG. 6 may correspond to to "computing the center point (x, y) of the object region and inputting it to the RPN" in FIG. 7. It is also possible in operation S602 to further compute the area N of the object region to be removed, and determine the size of each candidate region, that is, the size of each candidate rectangular box, based on the area of the object region to be removed. As shown in FIG. 6, if at operation S604 the size of the object region is determined to be above a threshold size, the size of the region to be clipped may be determined in operation S605 according to the area of the object region, and the size is also input to the RPN in operation S606, so that the RPN can generate a plurality of candidate regions including the object region to be removed based on the extracted image features (that is, the feature map of the original image), the center point coordinate (x, y) of the object region to be removed, and the size of the candidate region in operation S607.

The RPN may generate candidate region boxes with different sizes according to different areas of object regions to be removed. For example, the RPN may generate candidate region boxes, which can also be referred to as candidate region rectangular boxes and candidate boxes. In order to do so, the RPN may output parameter information such as center point coordinates, length and width of the candidate region boxes, and one candidate region box may correspond to one candidate region. For example, the RPN may generate the candidate region box starting with the point (x, y) according to the size of the input candidate region. For example, if at operation S604 the area of the object region to be removed is not more thank times of the area of the input image (the input image is an image input to the image inpainting network, i.e. a clipped image to be processed), for example, if the area of the input image in this example is 512*512, where k is 0.3, and the area of the object region to be removed is 512*512*0.2, the area is less than 512*512*0.3, in this case the size of the candidate region is 512*512, which may be input to the RPN at operation S608, and the RPN may randomly generate a candidate region at operation S609 with a rectangular box size of 512*512 in a region which can cover the minimum circumscribed rectangle of the region to be removed. In FIG. 7, each dashed box in the image 702 corresponding to the upper branch after RPN may be a candidate rectangular box, and the circle may correspond to the center point coordinate of the object region to be removed. If the area of the object region to be removed is greater than k times of the input image, the side length m of the candidate box (which can be understood as m pixels) may be determined by the formula $m=\sqrt{n/k}$ in this example at operation S606. Specifically, $m=\sqrt{n/0.3}=\sqrt{512/0.3}$, wherein m*m is the rectangular box size of the candidate region generated by the RPN, n is the size of scaled image of the original image, k is value of the area of the region to be removed divided by the area of the cropped image. At this time, at operation S607 the RPN may randomly generate a candidate region rectangular box with a size of m*m pixels in a region that can cover the minimum circumscribed rectangle of the region to be removed, and each dashed box in the image 703 corresponding to the lower branch after the RPN in FIG. 7 may be the candidate region rectangular box at this time.

After generating a plurality of candidate region rectangular boxes through the RPN, the classification network may be used to predict the most reasonable rectangular box among the generated plurality of rectangular boxes according to the image features extracted by the mobile-net, that is, the object region may be screened out from the plurality of candidate regions at operation S610 or operation S611, and the image may be clipped at operation S612 or operation S613 according to the region corresponding to the rectangular box in the original image to obtain the image to be processed including the object region to be removed. Specifically, the input of the classification network may include a feature map extracted by a mobile-net and the above-mentioned center point coordinate, length, width and other parameter information of each candidate region rectangular box output by the RPN, and the classification network may screen out the object region, i.e., the object rectangular box, according to the input information. As shown in the schematic diagram in FIG. 7, the original image 701 shown in the figure may be an image including a person standing on the lawn, the object region to be removed in the original image may be the region shown in white in the original image 701, a plurality of candidate rectangular boxes output by the RPN 705 and the feature map extracted by the mobile-net 704 may be input to the classification network 706, and an object candidate box may be obtained based on the output of the classification network 706. In embodiments, the output of the classification network may be the probability value or score of each candidate rectangular box, and the candidate rectangular box with the highest probability value or score may be used as the object candidate box. As shown in the schematic diagram, 90% of the image region in one candidate rectangular box 707 is a lawn, and 60% of the image region is a lawn and 20% thereof is a sky in the other candidate rectangular box 708. The classification network may judge that the candidate rectangular box 707 in which 90% of the region is a lawn includes more information for inpainting the original image 701 including the region to be removed, then the candidate rectangular box 707 is determined as an object rectangular box, and the image is clipped from the original image 701 according to the object rectangular box, where the region in the original image 701 corresponding to the rectangular candidate box 707 is the clipped image 709. For the original image 701 in this example, since the region to be removed includes two people standing on the lawn in the image, and the region occupied by the two people in the original image does not intersect with the sky, in the above two schematic candidate rectangular boxes, the candidate rectangular box 707 in which 90% of the region is a lawn is a more reasonable candidate rectangular box. Based on the embodiment of the present application, the image to be processed including more original image information for image inpainting may be obtained, which provides a basis for improving the effect of image inpainting.

In an embodiment, if the size of the object region to be removed, i.e., the area N, is less than n*n*k, such as less than 512*512*30%, the size of the region to be clipped is 512*512, and the size of each candidate region corresponding to each candidate region rectangular box generated by the PRN according to the size is 512*512. The classification network may directly classify the most reasonable region box from the plurality of candidate regions rectangular boxes generated by the RPN according to the feature map generated by the mobile-net. The image to be processed may be clipped out based on the region box. A corresponding mask image may be generated. The above two images may be input into an image inpainting network. After the inpainting is completed, the inpainting result can be fused with the original image, such as splicing the inpainting result with other parts of the original image except the image to be processed to obtain the reconstructed original image. If the size of the object region to be removed, that is, the area N, is greater than n*n*k, such as greater than 512*512*30%, the most reasonable region with m*m size screened out by the classification network may be scaled to 512*512 size, then a corresponding mask images may be generated according to the scaled image, and the scaled ratio ô may be recorded as a parameter for image super-resolution processing in the later stage, for example at operation S614 of FIG. 6. Then, after the inpainting of the image is completed at operation S615, the inpainting result may be restored at operation S616 to m*m size, for example (m, m) shown in FIG. 6, using super-resolution processing technology according to the scaling ratio ô, and the restored image may be fused with the original image at operation S617 to obtain the reconstructed original image.

In an example in which the size of the image clipped based on the original image is 768*768 pixels, i.e., the size of the candidate box is m*m=768*768, after clipping the image of this size including the object region to be removed, the image may be scaled to 512*512 pixels to obtain the image to be processed, and the scaling ratio is 1.5 at this time. After completing the inpainting operation of the image to be processed through the image inpainting network, in order to fuse the inpainting result with the original image, the image of 512*512 pixels after the inpainting needs to be super-resolved to 768*768 pixels, and then the super-resolution processed image may be spliced with the remaining part of the original image to obtain the original image after the final object removal is completed.

In practical applications, a network structure for image super-resolution processing may be added after the image inpainting network, and the specific form of the network structure may be configured according to actual requirements. If the image to be processed is a scaled image, the image inpainting network may perform super-resolution processing on the inpainting result through the network structure after outputting the inpainting result. The scaling parameter of the super-resolution processing, namely the scaling ratio, may be the scaling ratio corresponding to the scaling processing. If the image to be processed is an image without scaling processing, that is, the image directly obtained after clipping, the inpainting result of operation S618 may be spliced with the remaining part of the original image in operation S619 without super-resolution processing, or the inpainting result may also be input a network structure for super-resolution processing, in which the scaling ratio is 1.

Figure 8:
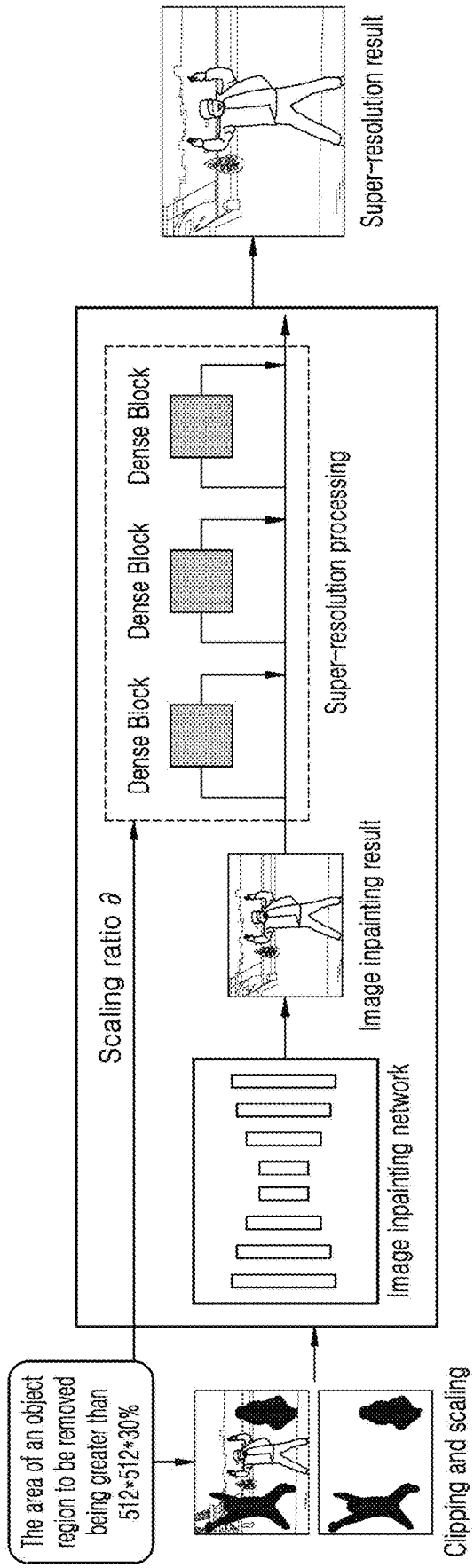
FIG. 8 illustrates a flowchart of performing a super-resolution processing according to an embodiment.

As an example, FIG. 8 illustrates a schematic diagram of a network structure for image super-resolution processing according to embodiment. As shown in FIG. 8, the network structure is a dense block network layer including a plurality of dense blocks, and dense blocks of each layer use a Residual-in-Residual method while deleting a batch normalization (BN) operation. That is, a residual block may be integrated with a dense block in a dense network (Densenet), and BN structures in the dense block may be deleted. When super-resolution processing is performed through the network structure, dense blocks of each layer may perform super-resolution processing on the input image according to the scaling ratio ô, and fuse the inpainting result and the output feature map of dense blocks of each layer, so that the final super-resolution processed result (corresponding to the super-resolution result in the image) may obtain more texture information, achieve better image super-resolution results, and restore the inpainting result output by the image inpainting network to the size of the clipped image before scaling.

In an embodiment of the present application, the step of inpainting the object region to be removed in the image to be processed according to the image to be processed and the mask image to obtain an inpainting result includes: extracting a fusion feature map corresponding to the image to be processed through an encoding network based on the image to be processed and a mask image; and inpainting the object region to be removed in the image to be processed through a decoding network to obtain an inpainting result based on the extracted fusion feature map.

After obtaining the image to be processed and the mask image corresponding to the image to be processed, the image inpainting network may be adopted to perform image inpainting on the object region to be removed in the image to be processed by using the depth learning technology based on the image to be processed and the mask image. The image inpainting network specifically may include both the above-mentioned encoding network and decoding network. The encoding network may be used for image downsampling processing to extract a fusion feature map fused with mask image information. The decoding network may perform upsampling processing based on the fusion feature map of each layer input by the encoding network to obtain the inpainting result.

In an embodiment of the present application, the encoding network and the decoding network may respectively include at least one first convolution module. Each first convolution module may perform convolution processing according to the input fusion feature map and output the fusion feature map obtained by the convolution processing.

It can be understood that when the encoding network and the decoding network include a plurality of (e.g., two) first convolution modules, the plurality of first convolution modules may be cascaded in sequence, that is, the input of the conventional convolution module may be the output of the previous convolution module, and the output of the conventional convolution module may be the input of the next convolution module. In addition, it can be understood that the first input of the first convolution module of the encoding network may be a mask image corresponding to the image to be processed and the image to be processed.

In practical application, in an embodiment, there may be pluralities of first convolution modules. At this time, when the object region to be removed is recovered, feature maps fused with mask image information and information of image to be processed at multiple layers of the image to be processed may be extracted through an encoding network, and simultaneously low-layer features and high-layer features of the image to be processed may be obtained. Since high-layer features have better feature expression capability and low-layer features include more underlying semantic information of images to be processed, the inpainting of object regions to be removed based on multiple feature maps of different layers may effectively improve the inpainting effect of images.

Specifically, the specific network structures of the encoding network and the decoding network may be configured according to actual requirements, for example, may be realized by a gated convolution (Gated Conv) network structure. The convolution processing method of the convolution modules in the gated convolution network structure may adopt a conventional convolution processing method, and may also adopt other convolution processing methods, such as a dilated convolution processing method.

From the foregoing description, it can be seen that the conventional image inpainting solutions based on depth learning algorithm mainly have a problem of "fish scale phenomenon" in the inpainting result, a problem of incomplete inpainting when the region to be removed being large, and a problem of large size of the inpainting network model. Embodiments of the present application may relate to mitigating or solving these problems.

In an embodiment of the present application, the encoding network further may include at least one second convolution module cascaded with the last first convolution module of the encoding network.

The second convolution module may perform convolution processing by adopting a dilated convolution (dilated Conv) processing method, namely a dilated convolution mechanism, according to the input fusion feature map, and may output the fusion feature map obtained after the convolution processing.

In an embodiment of the present application, if there are at least two second convolution modules, the at least two second convolution modules may be cascaded in sequence, and the convolution parameters of at least two of the second convolution modules may be different, wherein the convolution parameters may include, but are not limited to, dilation ratios.

When downsampling to extract a feature map through a conventional convolution operation, due to the limited receptive field region of convolution kernel during downsampling, the image feature information may not be effectively extracted in the region to be removed, especially when the area of the object region to be removed is large, which may lead to an inability to completely reconstruct the lost region of the image during upsampling. However, by using the dilated convolution mechanism, the receptive field can be increased while maintaining the original convolution computation amount, so that each element point in the feature map can obtain the information in the image, thus solving the problem that some regions cannot be recovered when the object region to be removed is large.

In addition, in an embodiment of the present application, for the encoding network, a second convolution module may be added on the basis of the first convolution module to further deepen the depth of the network, and more layers of feature maps used for image inpainting, for example feature maps input to the decoding network, may be extracted, and the image inpainting effect of the decoding network may be improved. However, the second convolution module may enable each element point in the fusion feature map output by the module to acquire information in the image as much as possible by adopting a dilated convolution processing method, thus greatly reducing the possibility that only one element point can correspond to the object region to be removed, thereby enabling the fusion feature map output by the module to include more information which can be used for image inpainting and further improving the image inpainting effect.

In an embodiment, in order to further avoid the problem that one pixel in the fusion feature map does not include information in the image when the object region to be removed is too large, at least two cascaded second convolution modules may be used, and the convolution parameters, such as dilation ratio, also known as expansion ratio, of at least two convolution modules during dilated convolution processing may be different. By using convolution modules with different convolution parameters, each convolution module may extract features corresponding to different regions and reduce the probability of occurrence of the above problems. The image sizes of the input feature maps and the input feature maps of second convolution modules may be the same or different. In an embodiment, in order to increase element points contained in the obtained feature map due to multiple feature extractions, the sizes of the input feature map and the output feature map of each second convolution module may be the same. In other words, when the second convolution module performs convolution processing, the convolution stride can be 1, and the size of the fusion feature map output by each second convolution module may be the same as the size of the fusion feature map output by the last first convolution module of the encoding network.

In addition, it should be noted that in practical application, when the decoding network performs upsampling processing based on the fusion feature maps output by each convolution module, for example the first convolution module and second convolution module, of the encoding network, for the fusion feature maps output by each second convolution module, only the fusion feature map output by the last second convolution module may be used for the decoding network, or the fusion feature maps output by each second convolution module may be used for the decoding network. In addition, when fusion feature maps with the same image size exist in the fusion feature maps output by each convolution module of the encoding network, in various embodiments only one or several or all of the fusion feature maps with the same image size may be used for the decoding network. For example, in an embodiment only the deepest layer of fusion feature map among the fusion feature maps with the same image size may be used for the decoding network. For example, when the convolution stride of each second convolution module is 1, the image size of the fusion feature map output by each second convolution module and the image size of the fusion feature map output by the last first convolution module may be the same, and only the fusion feature map output by the last second convolution module may be used for the decoding network.

The number of convolution modules included in the decoding network may correspond to the number of convolution modules included in the encoding network, and the correspondence here may be understood as the number of downsampling processes performed by the encoding network being the same as the number of upsampling processes performed by the decoding network. When each convolution module of the decoding network performs convolution processing, the input of the first convolution module (convolution module of the decoding network) connected with the encoding network may be a fusion feature map of the deepest layer output by the encoding network, and the first convolution module may realize upsampling through convolution processing based on the fusion feature map. The second convolution module of the decoding network connected with the first convolution module may perform convolution processing based on the feature map output by the first convolution module after upsampling and the fusion feature map of the previous layer output by the encoding network (relative to the fusion feature map input to the first convolution module). If only the fusion feature map output by the last second convolution module is used for the decoding network, the fusion feature map may be the fusion feature map output by the last first convolution module of the encoding network. For the decoding network, in each convolution module, except the first convolution module connected with the encoding network, the inputs of other convolution may module include the fusion feature map output by the convolution module of the corresponding encoding network, and also include the feature map output by the previous convolution module of the convolution module after upsampling processing. Based on this processing method, the fusion of the high-layer feature map and the low-layer feature map may be realized, which improves the information expression capability of the feature map and is beneficial to improve the image inpainting effect.

Figure 9A:
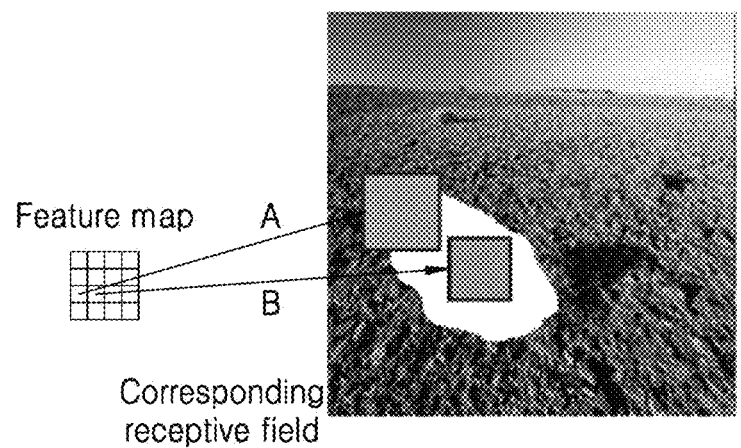
FIG. 9A illustrates a schematic principle diagram of a conventional convolution mechanism according to an embodiment.
Figure 9B:
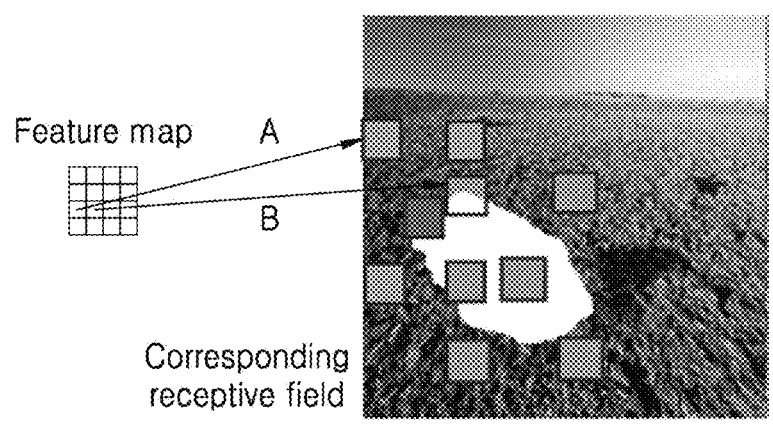
FIG. 9B illustrates a schematic principle diagram of a dilated convolution mechanism according to an embodiment.

As an example, FIG. 9A illustrates a schematic principle diagram of a conventional general convolution operation, and FIG. 9B illustrates a schematic principle diagram of a dilated convolution operation. As shown in FIG. 9A, the left side of the figure is a schematic diagram of a feature map extracted based on a conventional convolution operation. The receptive fields corresponding to a certain element point A and point B in the feature map are respectively two regions in the original image, which may be for example the image to be processed, or the image from which features may be extracted. The original image may be for example the image shown on the right side of FIG. 9A, wherein the sizes of the corresponding regions are determined by the size of the convolution kernel. The white region in the original image is the object region to be removed. As can be seen from FIG. 9A, the original image region corresponding to point A includes a part of original image information and a part of lost region, which may be for example the object region to be removed, and the original image region corresponding to point B is entirely a lost region, from which useful image information cannot be extracted.

As can be seen from the principle diagram of the dilated convolution operation shown in FIG. 9B, the original image region corresponding to each element point in the feature map includes original image information. That is, each element point of the feature map may extract the feature information of the original image. As shown in the figure, each element point may correspond to five regions in the original image (the five regions are arranged similar as the shape of five dots on the dice), and the figure illustrates five regions in the original image corresponding to points A and B respectively. By using the dilated convolution mechanism, more original image information can be extracted, thus improving the image inpainting effect.

In an embodiment of the present application, at least one convolution module in convolution modules, for example the first convolution module, or the first convolution module and the second convolution module, may perform convolution processing according to the input fusion feature map and output the fusion feature map obtained by convolution processing, including: performing a first convolution processing according to the input fusion feature maps to extract a corresponding image feature map; performing a second convolution processing based on the input fusion feature maps with the first channel number to extract the mask feature maps with the second channel number, wherein the mask feature map of each channel is obtained based on the feature map of at least one channel in the input fusion feature maps, and the number of at least one channel is smaller than the first channel number; and fusing the image feature map and the mask feature map and outputting the result of the fusion.

In other words, among all the convolution modules included in the encoding network and the decoding network, at least one convolution module may adopt the above solution for convolution processing. Specifically, for the convolution module adopting this solution, its input may be the fusion feature map output by the previous convolution module, that is, the fusion feature map of the previous layer. Based on the input, processing on two branches may be performed, in the first branch, the image feature map may be extracted based on the input fusion feature map, and in the other branch, the mask feature map may be updated based on the fusion feature map. That is, the mask feature maps of the required channel number may be obtained by adopting the way of the mask feature map of one channel being obtained based on one or more feature maps in the input fusion feature map (but the number is less than the total number of channels of the input fusion feature maps), and then the image feature map and the mask feature map may be fused to output the fusion feature map of the layer.

The second channel number may be specifically the number of channels of the extracted image feature map. When the feature map and the mask feature map are fused, the image feature map and the mask feature map of the corresponding channel may be fused according to the channels.

Based on the image to be processed and the mask image (for the first convolution module of the encoding network), or the image feature map (for other convolution modules except the first convolution module of the encoding network) and the updated mask feature map, the fusion feature map may be obtained. In an embodiment, a partial convolution operation may be performed on the image to be processed/image feature map, and whether convolution operation is performed on some regions of the image to be processed/image feature map may be determined based on the mask image/mask feature map. When the convolution module outputs the fusion feature map extracted by convolution processing, for the extraction of the fusion feature map of the current layer, in addition to extracting the corresponding image feature map based on the fusion feature map of the previous layer, the mask feature map corresponding to the image feature map may also be obtained, that is, the required mask feature map of the current layer may be updated based on the fusion feature map of the previous layer.

In conventional gated convolution technology, the update of the mask feature map may update the mask feature map of the image feature map of each layer through many-to-many gated convolution. If the number of input fusion feature maps, i.e. the fusion feature maps of the previous layer, is M, the number of mask feature maps to be updated is N, and each mask image in the N mask feature maps needs to be updated based on M feature maps by gated convolution, then N mask feature maps need N*M convolution operations in total, which requires a large amount of computation, and the probability of occurrence of "fish scale phenomenon" in the inpainting result based on this method is also high.

In view of the above problems, the an embodiment of the present application may not use a many-to-many convolution method to update the mask feature map, that is, an embodiment may not update each mask feature map based on the fusion feature map of the previous layer, but may instead obtain the fusion feature map of one channel based on one or more but not all of the fusion feature maps of the previous layer. Accordingly, the amount of data to be processed can be effectively reduced, the computation amount can be greatly reduced, and compared with related art, the probability of occurrence of "fish scale phenomenon" can be reduced.

In an embodiment of the present application, before performing the second convolution processing based on the input fusion feature map with the first channel number, and extracting the mask feature map with the second channel number, the method may further include converting the input fusion feature map into the fusion feature map with the second channel number if the first channel number is not equal to the second channel number.

At this time, based on the input fusion feature maps with the first channel number, a second convolution process may be performed to extract the mask feature maps with the second channel number, including: based on the converted feature map of each channel in the fusion feature maps with the second channel number, a second convolution process may be respectively performed to extract the mask feature map corresponding to each channel.

When the mask feature map of one channel is obtained based on the feature map of at least one channel in the input fusion feature maps (i.e., the mask feature map of one channel is obtained based on the fusion feature map of at least one channel of the previous layer), the mask feature map of a corresponding channel may be specifically obtained based on the feature map of one channel in the input fusion feature map. In other words, a one-to-one mask feature map update method may be adopted to extract the mask feature map of the corresponding channel based on the fusion feature map of each channel, and the computation amount may be further reduced based on the solution.

In addition, when a one-to-one mask feature map updating method is adopted, and the required number of channels of the mask feature map is not equal to the number of channels of the input fusion feature map, that is, when the second channel number is not equal to the first channel number, the input fusion feature map may be first converted according to the second channel number (e.g., the conversion processing can be performed by a full convolution operation, etc.). In an embodiment, the input fusion feature map with the first channel number may be converted into the feature maps with the second channel number, and a corresponding mask feature map of one channel may be obtained based on the feature map of each channel among the converted feature maps with the second channel number.

In an embodiment of the present application, the mask feature map of one channel may be obtained based on the feature map of at least one channel in the input fusion feature maps, which may specifically include: performing a processing according to at least two convolution processing parameters, respectively, and extracting feature maps corresponding to at least two receptive fields, based on the fusion feature map of at least one channel in the input fusion feature maps; and fusing the extracted feature maps corresponding to at least two receptive fields to obtain a mask feature map of one channel.

In order to obtain a mask feature map with better feature expression capability, the feature maps corresponding to various receptive fields may be extracted based on the fusion feature map, and then the mask feature map may be obtained by fusing the feature maps of various receptive fields, when the corresponding mask feature map is obtained based on the fusion feature map of the corresponding channel. Because the feature expression capabilities of feature maps corresponding to different receptive fields are different, feature maps corresponding to larger receptive fields may have stronger feature expression capabilities, while feature maps corresponding to smaller receptive fields may include more image semantic information, therefore, mask feature maps obtained based on this fusion method may have better expression capabilities.

For example, when performing the second convolution processing by adopting the above one-to-one manner to obtain the mask feature map, the convolution processing may be performed by using at least two convolution processing parameters based on the feature map of each channel in the input fusion feature maps (or the converted feature maps) to obtain the feature maps corresponding to at least two receptive fields, and then the feature maps corresponding to the at least two receptive fields may be fused to obtain the mask feature map of one channel.

Because obtaining the fusion feature map through convolution processing provided by the application may greatly reduce the computation amount compared with conventional convolution processing, when extracting features based on the depth learning algorithm, compared with related art, a deeper network structure may be adopted to extract features of more layers, so that a better inpainting effect may be obtained when performing image inpainting based on the extracted features of multiple layers.

An example of fusion feature map extraction provided by an embodiment of the present application will be described in further detail below with a specific example.

Figure 10A:
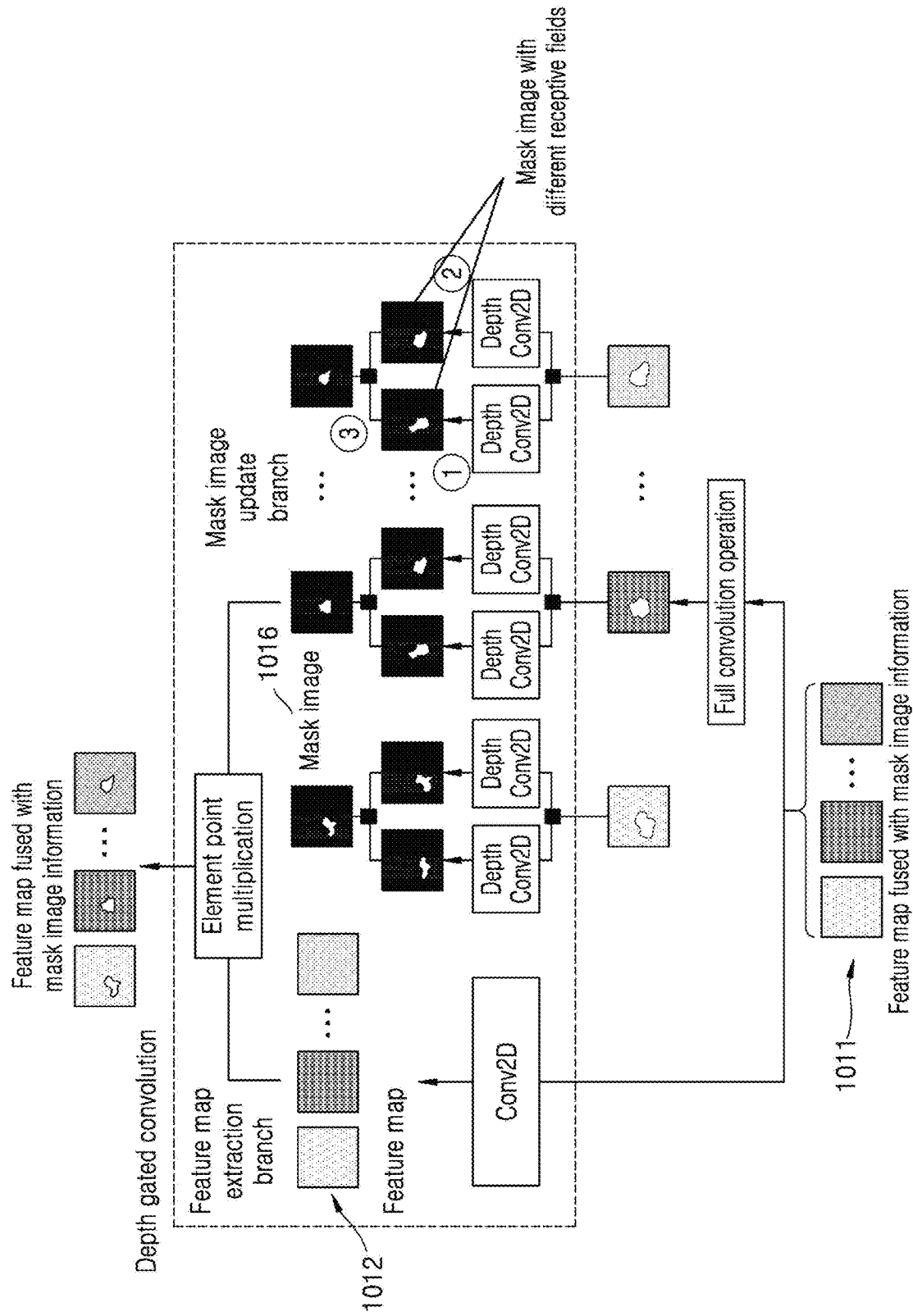
FIG. 10A illustrates a schematic principle diagram of performing feature image extraction based on a depth gated convolution (Depth-Gated convolution) structure according to an embodiment.

FIG. 10A illustrates a schematic structural diagram of a first convolution module provided by an embodiment of the present application. As can be seen from FIG. 10A, the convolution structure of the convolution module may be an improved gated convolution structure, which may be referred to as a depth gated convolution. As shown in FIG. 10A, the depth gated convolution structure includes a feature map extraction branch and an updated mask image branch, wherein the convolution structure used for performing second convolution processing on the input fusion feature map in the updated mask branch may be referred to as a depth convolution layer, illustrated in FIG. 10A as Depth Conv2D. In an embodiment, the feature map extraction branch may be used to perform the first convolution processing through a convolution structure, illustrated in FIG. 10A as Conv2D, according to the input fusion feature maps 1011 to obtain an image feature map 1012. When updating the mask image, the depth gated convolution may only use the feature map of one channel in the input feature maps, and may update the mask image (i.e., mask feature map) using receptive fields with different sizes. In actual processing, since the number of channels of the updated mask feature map should be the same as the number of channels of the feature map (i.e. image feature map) extracted by the feature map extraction branch, the number of channels of the input fusion feature map need to be converted into the number of channels of the output feature map by conversion processing on the input fusion feature map, if the number of input channels and output channels of the depth convolution layer are inconsistent, that is, if the number of channels input to the gated convolution structure feature map (that is, the number of channels of input feature maps) is not equal to the number of channels of the output feature map of each branch. For example, the number of input channels and output channels may be consistent by using a full convolution network. If the depth gated convolution needs to obtain N mask images by updating, and the number of channels of the input feature maps is M, the FCN may be used to convert the number of channels into N. For each of the N mask images to be updated, it can be updated by using only one of the N feature maps after full convolution conversion, and further updated by using convolutions with different receptive field sizes (corresponding to ① and ② in FIG. 10A) during the updating process. Finally, the full convolution may be used to fuse the mask images obtained by using different receptive fields into one final updated mask image (corresponding to ③ in FIG. 10A) to complete the update of the mask image.

For the image inpainting task, the mask image 1016 may be used to determine which part of the feature map can be transferred to the next layer and which part of the feature cannot be transferred to the next layer, i.e. the mask image has weighted the feature map of the data. In order to use convolution operation to realize the weight processing mechanism, as with the gated convolution, the depth gated convolution needs to make the output range of the full convolution of mask images fused with different receptive fields be between [0, 1]. Therefore, an activation function such as sigmoid may be used to ensure that the range of output data values is between [0, 1], so as to realize the goal of weighting the feature map of the image through the mask image when the point multiplication is performed on the corresponding elements.

Figure 10B:
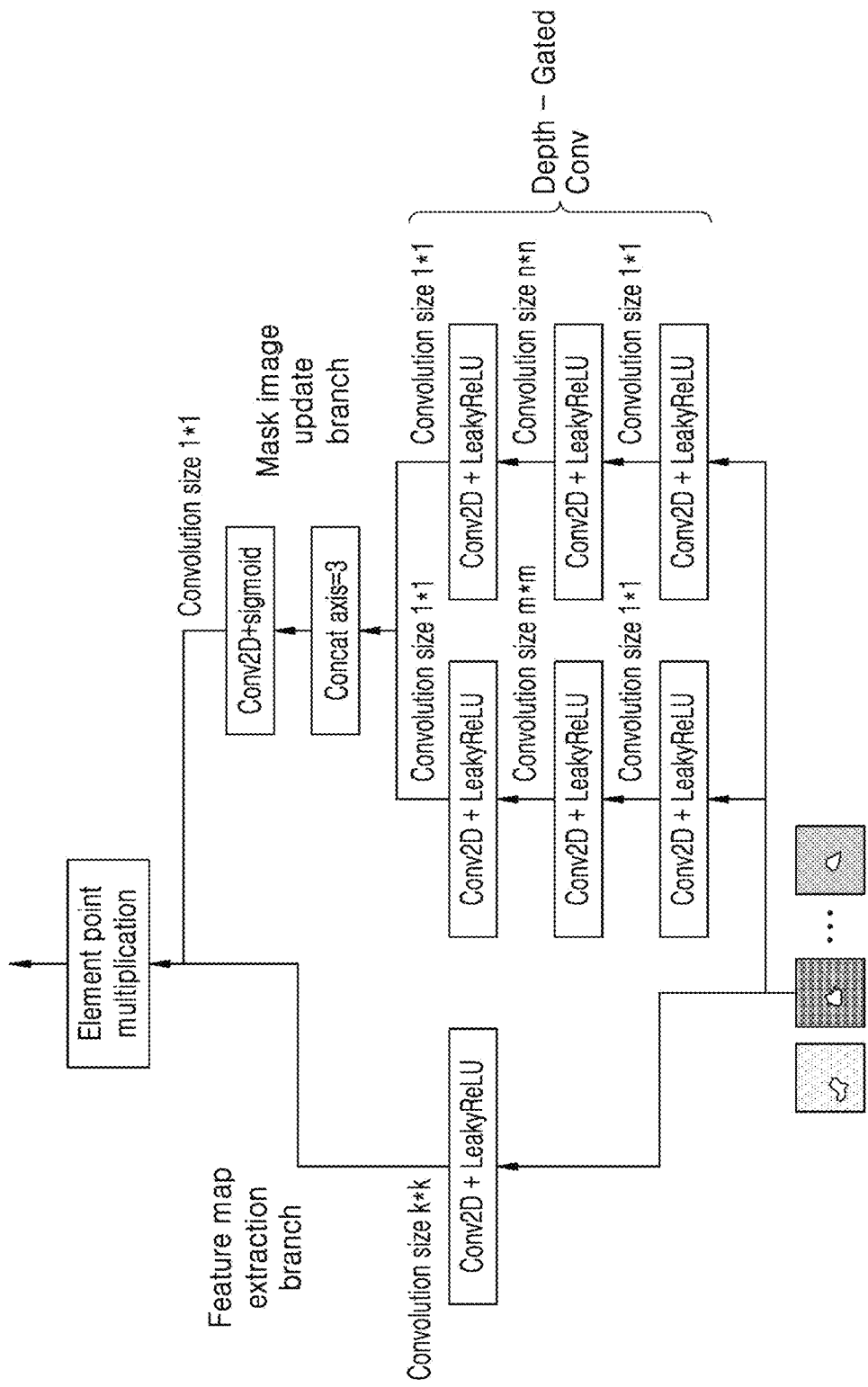
FIG. 10B illustrates a schematic diagram of a depth gated convolution structure according to an embodiment.

As an example, FIG. 10B illustrates a detailed structural diagram of a first convolution module according to an embodiment of the present application. As shown in the figure, the feature map extraction branch can be implemented using a conventional convolution with a leakyReLU activation function (Conv2D+leakyReLU shown in FIG. 10B). In this example, the convolution kernel size of the convolution structure is k*k. The branch may be used to extract image feature maps based on the fusion feature map of the previous layer, so there is no requirement for the output range of the branch activation function, that is, any activation function may be used. The mask image update branch may update the mask image using different receptive fields, and each branch may include branches corresponding to a plurality of different receptive fields. In the network structure shown in FIG. 10B, feature maps may be extracted using two different receptive fields, so the mask image update branch may include two branches.

The feature map extraction structure (the depth conversion structure, that is, Depth-Gated Cony shown in FIG. 10B) corresponding to each receptive field in the mask image update branch (which can also be referred to as the mask image update branch) in this example shown in FIG. 10B may include a three-layer convolution extraction structure cascaded in sequence, and the convolution kernel sizes (convolution sizes shown in FIG. 10B) of the three-layer convolution extraction structure of one branch shown in the figure are 1*1, m*m and 1*1, respectively, and the convolution kernel sizes of the other branch are 1*1, n*n and 1*1, respectively. The convolution structure of which the first convolution kernel size is 1*1 of each branch may be suitable for converting the number of channels of input feature maps into the required number of channels of a given output feature map. If the number of channels of the input feature maps is M and the number of mask feature maps to be output is N, the first convolution structure may be used to convert the input feature maps with the number of channels M into the feature maps with the number of channels N, the second convolution structure (in which the convolution kernel size may be m*m or n*n) may be used to extract the feature map of the corresponding receptive field based on the feature map input by the first convolution structure, and the third convolution structure may be used for further feature extraction on the feature map output by the second convolution structure. The feature maps corresponding to different receptive fields extracted by the two branches may use channel connection operation (the Concat axis=3 structure shown in FIG. 10B, where axis=3 may refer to connecting according to channels), to connect the mask feature maps extracted from the two branches of the previous layer, and use full convolution network and limit the output range of the full convolution network to [0, 1]. For example, convolution with sigmoid activation function structure (Conv2D+Sigmoid shown in FIG. 10B) may be adopted to limit the output range of the layer and complete the update of the mask image.

After that, corresponding-element point multiplication may be performed on the image feature map extracted by the feature map extraction branch and the mask feature map output by the mask image update branch according to corresponding channels, the mask feature map output by the mask image update branch may be multiplied by the image feature map output by the feature map extraction branch, to complete weighting of the feature map based on the mask image information, and a fusion feature map fused with the mask image information may be output.

In addition, it can be understood that m and n in this example are independent of m and n in the previous example of image clipping based on semantic information.

Figure 10C:
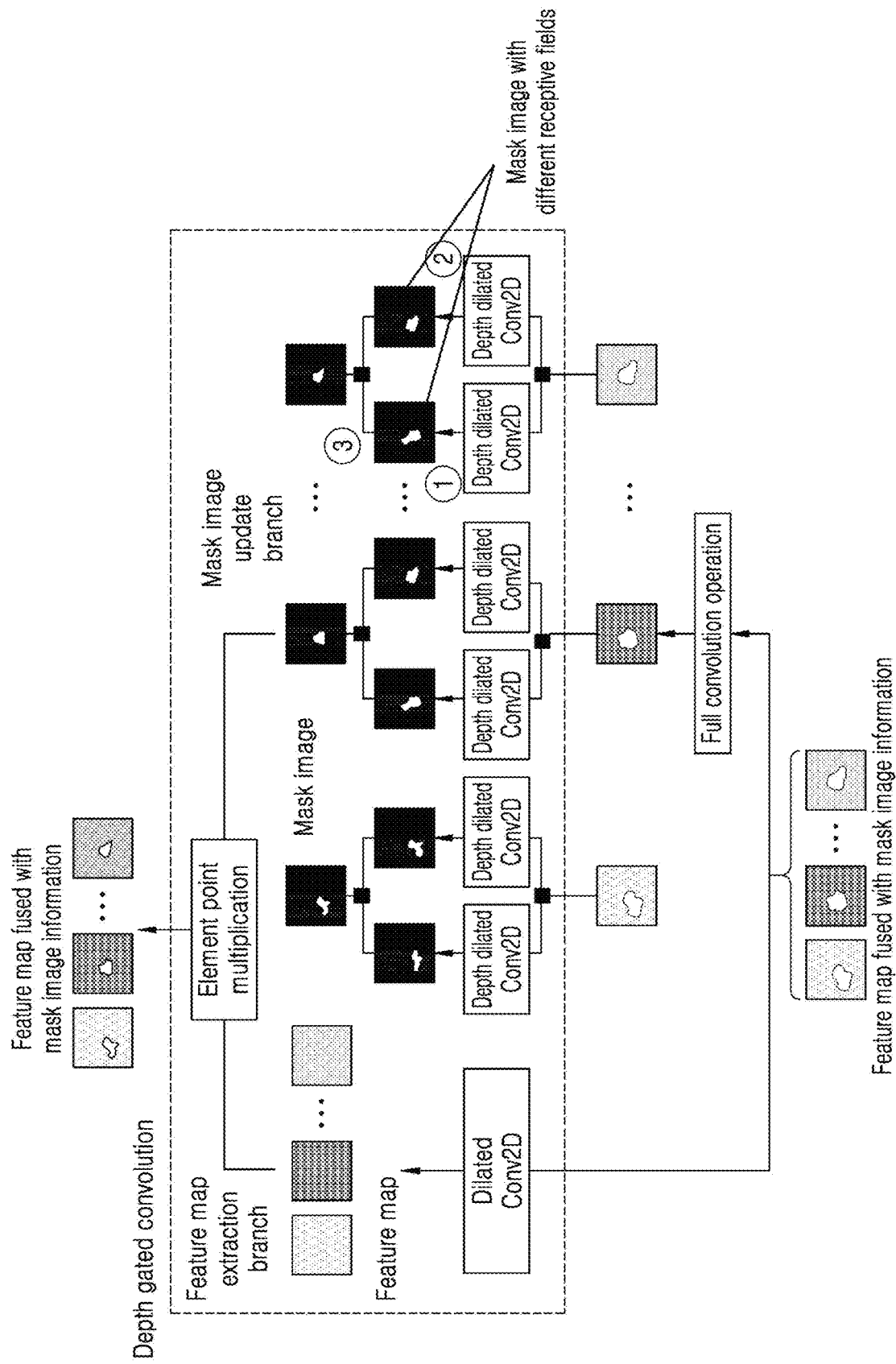
FIG. 10C illustrates a schematic principle diagram of performing feature map extraction based on a depth gated convolution structure using a dilated gated convolution mechanism according to an embodiment.

From the foregoing description, it can be seen that in order to include as much information of the image to be processed as possible in the extracted fusion feature map, a dilated convolution mechanism may be used in extracting the fusion feature map. Therefore, when extracting the fusion feature map based on the depth gated convolution structure provided by the embodiment of the present application, each convolution part in the depth gated convolution structure may also adopt a dilated gated convolution processing method. Taking the depth gated convolution structure shown in FIG. 10A as an example, after the convolution parts (Conv2D and Depth Conv2D parts) in the depth gated convolution structure shown in FIG. 10A are replaced with dilated gated convolution, its network structure may be as shown in FIG. 10C, that is, the convolution parts in the structure shown in FIG. 10A can be replaced with dilated convolution correspondingly. Taking the network structure shown in FIG. 10B as an example, the conventional convolution (Conv2D shown in FIG. 10B) in FIG. 10B may be replaced with a dilated convolution (Dilated Conv2C shown in FIG. 10C), and the depth convolution (Depth-Gated convolution shown in FIG. 10B) may be replaced with a depth dilated convolution (Depth dilated Conv2D shown in FIG. 10C). In an embodiment, when extracting fusion feature maps of multiple layers, the dilated convolution mechanism of each layer may adopt the same or different dilation ratios. In an embodiment, in order to extract as much effective information as possible from images, the dilation ratios may gradually change, such as can be gradually increased, with the deepening of the network layer.

It can be understood that when the second convolution module in the encoding network extracts the fusion feature map using the convolution processing method provided in the embodiment of the present application, the network structure shown in FIG. 10C can be a schematic structural diagram of an optional second convolution module.

In an embodiment of the present application, the object region to be removed in the image to be processed may be reconstructed according to the image to be processed and the mask image to obtain an inpainting result, including: obtaining a preliminarily inpainting result based on the image to be processed and the mask image; generating a noise image with the same size as the image to be processed; and obtaining the inpainting result based on the preliminary inpainting result and the noise image.

In the image inpainting operation, the "fish scale phenomenon" often appears in the inpainting result. By observing the inpainting result including "fish scale phenomenon", it can be found that the color information in the semantic information of "fish scale phenomenon" is consistent with the background information, but the texture information is inconsistent, and the more abundant the texture information, the greater the probability of "fish scale phenomenon". The "fish scale phenomenon" presents a regular texture similar to fish scales. In order to solve the "fish scale problem", the regular texture may be destroyed. Random noise information may be added to the last layer of upsampling, and the effect of destroying the regular texture may be achieved through convolution operation, thus further reducing the occurrence of "fish scale phenomenon".

Specifically, after obtaining the fusion feature maps of multiple layers based on the image to be processed and the corresponding mask image, in the image decoding part (i.e., the part in which processing is performed through the decoding network), the up-sampling processing may be performed based on the fusion feature maps of the multiple layers to obtain the inpainting result. Wherein, after the upsampling process of the last layer is completed, the inpainting results of multiple channels (usually three channels of R, G and B) may be obtained. In order to further avoid the "fish scale phenomenon", noise images with the same size can be generated as the sizes of the images of the three channels respectively, for example, gaussian noise images with the same size as the inpainting results respectively may be generated, and the inpainting results and noise images of the three channels may be combined to obtain image data of four channels, and the final inpainting result image may be further generated through convolution operation. Wherein, the range of the element value of each element point in the noise image may be configured according to actual requirements. As an alternative, the range can be [−1, 1], that is, the element value of each element in the noise image may be a randomly generated random number with size between −1 and 1.

In an embodiment of the present application may further include processing the object map by at least one of the following: randomly exchanging element values of element points in adjacent locations in the object map; and randomly adjusting element values of element points in the object map, wherein the object map is at least one fused feature map and/or an inpainting result obtained through the decoding network. That is, the object map may be any fusion feature map involved in the encoding network or the decoding network described in the foregoing and can also be an inpainting result obtained by the decoding network. The inpainting result may be an image output by the decoding network, such as the above-described preliminary inpainting result, or an image after further processing the image output by the decoding network, such as the above-described inpainting result obtained based on the inpainting result and noise image.

In an embodiment, the processing described above may be specifically a processing after the output of the image inpainting model or may be nested in the model as a special layer of data processing. When the processing is performed on the object map, if there is any subsequent processing based on the object map, the corresponding processing may be performed based on the processed object map. For example, when the object map is a fusion feature map, the subsequent processing based on the fusion image may be a processing based on the map which is processed based on the fusion feature map by the processing method in the solution. If there is no other subsequent processing on the object map (such as the inpainting result), the processed object map may be the final inpainting result.

As can be seen from the foregoing description, in order to improve or solve the "fish scale phenomenon", the regular texture in the image may be destroyed. However, in the process of image inpainting, due to the encoding and decoding of the image (for example, in the process of image inpainting through the decoding network based on the fusion feature map, the upsampling of the feature map), the element values of the element points in a certain region (such as a certain row and a certain column in the image) in the image are likely to be centrally too large or too small, resulting in the occurrence of the "fish scale phenomenon". According an embodiment of the application, the problem of centrally too large or too small of element values in a certain region in the object map may be effectively avoided through random exchange and/or random adjustment of element values in the object map, so that the occurrence of "fish scale phenomenon" caused by the problem may be effectively solved, and the effect of the finally obtained inpainting result may be improved.

In an embodiment of the present application, the step of randomly exchanging element values of element points in adjacent locations in the object map may include: performing at least one of the following processing on the object map, and obtaining a processed object map with the same size as the object map based on a map after the at least one processing: performing a first edge clipping and a second edge clipping on the object map to obtain a first clipped map and a second clipped map; generating a first weight map corresponding to the first clipped map and a second weight map corresponding to the second clipped map, wherein element values of the element points in the first weight map and the second weight map are 1 or 0, and the element values of the element points of the same positions in the first weight map and the second weight map are different; and fusing the first clipped map and the second clipped map based on the first weight map and the second weight map to obtain a processed map.

The number of times of the above-described processing performed on the object map can be determined based on requirements. It can be understood that, when the number of times of performing the above-described processing is more than one, the steps of performing the processing again, except for the first time, are processing performed on the basis of the map after the previous processing. After the determined number of times of processing is completed, the processed image may be processed by image completion, image blur operation, etc. to obtain a processed object map with the same size as that before processing. Subsequent processing based on the object map may be performed on the basis of the processed object map.

In addition, when the above-described edge clipping is performed on the object map (or the object map subjected to the above-described processing in sequence or multiple times), the specific clipping method is not limited in the embodiment of the present application and can be determined based on requirements. However, it is clear to those skilled in the art that in order to realize the exchange of the element values of the element points in the object map, the first clipped map and the second clipped map may be two maps with the same size but different image contents, that is, some or all of the element points in the two clipping maps have different element values. In addition, in order to avoid the loss of too much information in the object map, when clipping, a small part of the object map may be clipped out, such as clipping a certain row (or rows) and/or a certain column (or columns) of element points. When the image completion is performed on the processed image, the clipped element points may be complemented according to the specific clipping method, to obtain a map with the same size as the object map before processing.

The specific mode of completion is not limited to the embodiments described above. For example, the corresponding location may be completed according to the clipping method. For example, if the image is clipped on the upper side and the left side of the image, the completion may be performed on the upper side and the left side. In addition, it can also be completed in one or several directions. For example, if the image is clipped on the upper side, it may be completed on the lower side. When the completion is performed, since the information that is clipped out during the clipping is small, it may not have a substantial impact on the final inpainting result, that is, it does not have a visual impact on the user. Therefore, the completion data is not limited in the embodiment of the present application. For example, the completion data may be any number, or may be complemented by the clipped-out portion.

Figure 10D:
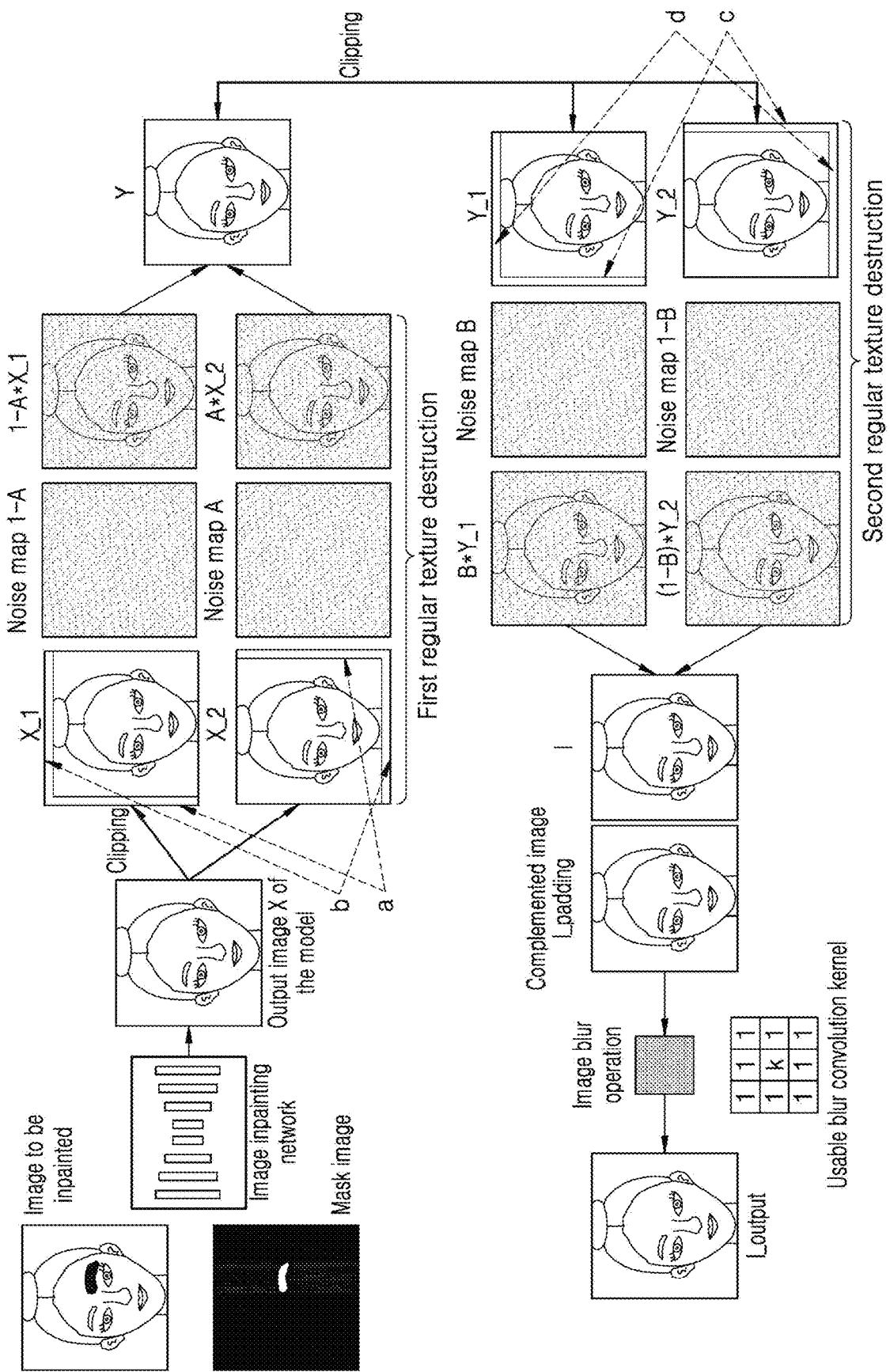
FIG. 10D illustrates a schematic principle diagram of an image processing method according to an embodiment.

In an embodiment illustrated for example in FIG. 10D, the map width of the object map may be w and the height may be h, and when the object map is clipped, an image with the first set width (denoted as a) may be clipped from the left side of the object map and an image with the second set width (denoted as b) may be clipped from the upper side of the object map to obtain a first clipped map, an image with the first set width may be clipped from the right side and an image with the second set width may be clipped from the lower side of the object map to obtain a second clipped map, so that the first clipped map and the second clipped map with the width of w−a and the height of h−b may be obtained. It can be understood that the first clipped map and the second clipped map are interchanged. When the two exchange processes are performed, the second process may be performed on the result of the first process. For example, after processing is performed based on the object map, the processed image with the width of w−a and the height of h−b can be processed again. For example, an image with the third set width (denoted as c) may be clipped from the left side and an image with fourth set width (denoted as d) may be clipped from the upper side of the image with the width of w−a and the height of h−b to obtain a first clipped map of this processing, and an image with the third set width may be clipped from the right side and the fourth set width may be clipped from the lower side of the image with the width of w−a and the height of h−b to obtain a second clipped map of this processing.

The first weight map and the second weight map may be randomly generated images, such as a noise image in which the element values only include 0 and 1 in the randomly generated image. Because the element values of the element points in the same location in the first weight map and the second weight map are different, and the element value only includes 0 and 1, if the first weight map is the map A, the second weight map can be map 1−A, that is, the element values of the element points in the same location in the first weight map and the second weight map are respectively 1 and 0, or 0 and 1. For each element point in the fused image, the element values of the element points in the first clipped map and the second clipped map are randomly selected to realize random exchange of element values based on the fusion method, since the element values in the same location in the first weight map and the second weight map are 1 and 0 (or 0 and 1) and 1 and 0 are randomly generated, when fusing the first clipped map and the second clipped map based on the first weight map and the second weight map. Specifically, the fusion of the first clipped map and the second clipped map may be implemented based on the following Equation 1:

$$A*X1+(1-A)*X2 \qquad \text{(Equation 1)}$$

Wherein, X1 and X2 represent a first clipped map and a second clipped map, respectively, and A and 1−A respectively represent a first weight map and a second weight map. For the element points in any same location of the first clipped map and the second clipped map, the element value of the element point in the fused map can be obtained based on the element values of the element points in the first clipped map and the second clipped map and the element values of the element points in the first weight map and the second weight map.

The random exchange method of the element values provided in this application will be described below with an example.

In this example, the post-processing flow after image inpainting is taken as an example for description in this example, that is, the object map is an inpainting result, specifically an output image of the image inpainting network, and two random exchange processing of the above-described element values are performed in this example. FIG. 10D illustrates a schematic flow diagram of an image processing method according to an embodiment of the present application. As shown in FIG. 10D, the processing flow of the method may include the following.

First, an image to be reconstructed (an image to be processed, in which the white region, i.e. the eyebrow region of the object map, is the object region to be removed) and the mask image (the mask image of the image to be processed) are input into the image inpainting network to obtain the output image X of the model, which has a width w1 and a height h1. A regular fish scale phenomenon occurs in the region corresponding to the object region to be removed in the output image X. For an enlarged view of the corresponding region, it should be noted that in order to display the fish scale phenomenon more clearly, the schematic diagram is a schematic diagram after adjusting the color scale of the image in the corresponding region in FIG. 10D.

For the output image X, with the upper left corner of the image as the coordinate origin, an image in the range of the width [0, w1−a] and the height [0, h1−b] is clipped from the image X (i.e., an image with the width of a and an image with the width of b are clipped from the right side and the lower side of the image respectively) to generate a first clipped image X_2. An image in the range of the width [a, w1] and the height [b, h1] (an image with the width of a and an image with the width of b are clipped from the left side and the upper side of the image respectively) is clipped from the image X to obtain second clipped image X_1. A noise map $I_{noise1}$, which may correspond to the noise image A shown in FIG. 10D, with the size of the width of w1−a and height of h1−b is generated, and the values of the noise image A include only randomly generated 0 or 1. The noise map $I-I_{noise1}$ is obtained by subtracting noise map A from the element points in the image whose element values are all 1 with the same size as the noise map, wherein I denotes an image, whose size is the same as the clipped image and values are all 1. The operation result image Y is obtained by using the formula $(1-I_{noise1})*X\_1 \pm I_{noise1}*X\_2$, wherein the symbols "+", "−", and "*" in the formula are the addition, subtraction, and corresponding-point point-multiplication operations respectively, and thus the exchange of image elements is completed. It can be seen that the image after one exchange process can be expressed by the following Equation 2:

$$X\_2_{j \in (0,h_1-b)}^{i \in (0,w_1-a)} \odot I_{noise1} + X\_1_{j \in (b,h_1)}^{i \in (a,w_1)} \odot (I_1 - I_{noise1}) = Y \qquad \text{(Equation 2)}$$

Where i and j respectively represent the pixel points in the first clipped image and the second clipped image processed at this time. It can be seen that the pixel value of each pixel in the image Y is equal to the sum of the product of the pixel value of the pixel point in the first clipped image and the weight value of the pixel point in the weight map of the first clipped image and the product of the pixel value of the pixel point in the first clipped image and the weight value of the pixel point in the weight map of the second clipped image.

At the time of the second process, the processing is based on the image Y, and the width and height of the image Y are w2 and h2, respectively. Like the first process described above, Y is clipped as an image having the width [0, w2−c] and the height [0, h2−d] to obtain Y_2, and Y is clipped as an image having the width [c, w2] and the height [d, h2] to obtain Y_1. As above, the noise image B whose width and height are respectively w2 and h2 is generated, and the result image I is obtained by the formula B*Y_1+(1−B)*Y_2.

After the above two processes are completed, the width and height of the image I are respectively complemented to w1 and h1. The image may be complemented by complementing parts on the upper, lower, left and right sides respectively, or a part only in a certain direction. The data used to complement image may be any number and also the clipped image during the first process, and the complemented image is recorded as I_padding. In order to make the processed image smoother and more natural, after the image I_padding is obtained, an image blur operation can be performed. For example, a Gaussian convolution kernel blur is used to perform blur operations respectively on the three channels R, G, and B of the image I, and combine the data after the blur operation, to obtain the final output image I_output. For example, for a blur convolution kernel with the size 3*3 shown in the figure, when the image is blurred based on the convolution kernel, based on the pixel value of any pixel point of any channel in the image, the blurred pixel value is obtained by weighted average of pixel points within the range of 3*3 with the pixel point as the center. For example, assuming that the weights of the peripheral pixel points of the pixel point are all same, and the weight of the pixel point itself is k times the weight of the peripheral pixel points, the pixel value of the blurred pixel point is the weighted average of the pixel values of the nine pixel points.

According to the embodiment described above, after the image inpainting processing is completed, the fish scale phenomenon in the above image X can be effectively eliminated.

In an embodiment of the present application, the step of randomly adjusting element values of element points in the object map may include: performing at least one of the following processing on the object map, and obtaining a processed object map with the same size as the object map based on a map after the at least one processing: performing a third edge clipping and a fourth edge clipping on the object map to obtain a third clipped map and a fourth clipped map; obtaining an adjustment coefficient of the fourth clipped map based on the third clipped map; and adjusting element values of element points in the fourth clipped map based on the adjustment coefficient to obtain a processed image.

For the description of the third clipped map and the fourth clipped map, reference may be made to the descriptions of the first clipped map and the second clipped map in the foregoing.

According to the solution provided by the embodiment of the present application, the adjustment of the element values in another clipped map can be implemented based on one clipped map, so that the occurrence of a region whose element values are centrally too large or too small in the object map can be effectively avoided. The adjustment coefficient may include an adjustment coefficient of each element point in the first clipped map, and the adjustment coefficient may have a value range of [0, 1].

In an embodiment, the value of the adjustment coefficient may be 0 or 1. Accordingly, the random deletion of the element values in the object map may be implemented, and the concentrated area that may appear above may be more effectively avoided.

The adjustment coefficient map for obtaining the fourth clipped map based on the third clipped map may be configured according to actual application requirements, for example, it may be implemented by a cascade convolution structure and excitation layer structure. Specifically, the convolution structure is used for feature extraction on the third clipped map, and an excitation layer structure (such as a sigmoid function) is used to output an adjustment coefficient map of the above-described range of values (or a value 0 or 1) based on the extracted feature map. The adjustment of the element values of the element points in the fourth clipped map based on the adjustment coefficient map may be direct processing of the fourth clipped map based on the adjustment coefficient map or processing of the preprocessed (such as convolution processing) fourth clipped map based on the adjustment coefficient map.

Figure 10E:
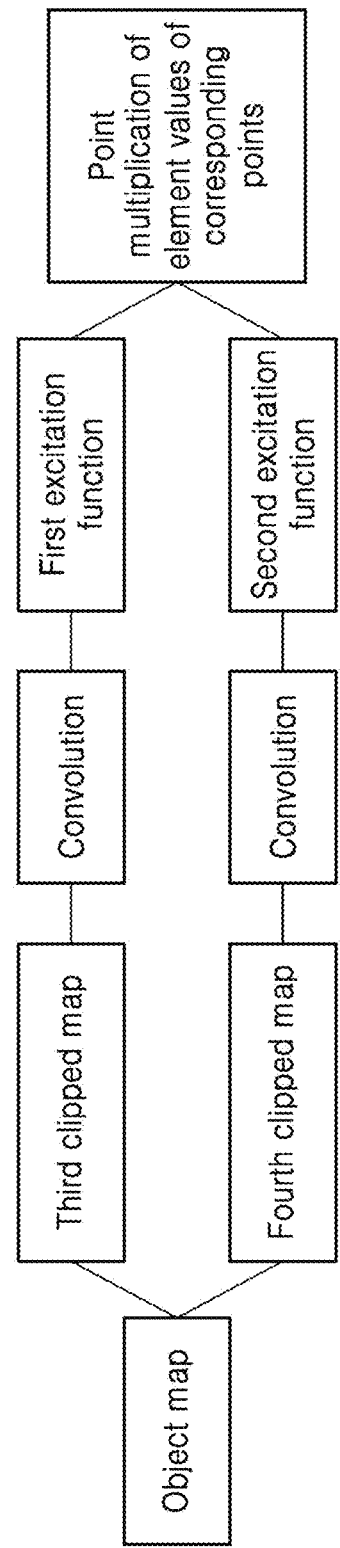
FIG. 10E illustrates a schematic principle diagram of a solution for randomly adjusting element values in an object map according to an embodiment.

As an example, FIG. 10E illustrates a schematic diagram of performing element-value adjusting on an object map provided by the present application. As shown in the figure, for the object map, the third clipped map and the fourth clipped map may be obtained by different clipping methods. For example, it can adopt the clipping method shown. For the third clipped map, after the convolution processing, the feature maps with element values being 0 and 1 may be obtained via a first excitation function (such as a sigmoid function). That is, each element point in the feature map is an adjustment coefficient, which can be called an adjustment coefficient map. For the fourth clipped map, after the convolution processing, the corresponding feature map is output after processing via a second excitation function (which can be selected as requirements, such as a sigmoid function, a softmax function, etc.), and a point multiplication operation of the corresponding element points may be performed on the feature map and the adjustment coefficient map, to obtain a processed image. Similarly, after the processing operation is completed, the final output image may be obtained by operations such as image completion and image blur processing.

It should be noted that, in practical applications, the value of the elements in the map may be adjusted to avoid the problem of centrally too large or too small of element values in a certain region. Therefore, in this processing method, the sizes of the input map (i.e. object map) and the output map (i.e. the map after adjusting the object map) may be the same.

FIG. 11 illustrates an overall flowchart of an image processing method 1100 according to embodiments. As shown in FIG. 11, the image processing method 1100 may include, in operation S1110, image clipping based on semantic information, i.e., clipping based on semantic information. At operation S1120, image processing method 1100 may include special convolution for image inpainting (i.e. depth gated convolution) and a modified U-net structure. At operation S1130, image processing method 1100 may include super-pixel processing of the inpainting result (also referred to as super-resolution processing).

In an embodiment, the image clipping based on semantic information and super-pixel inpainting result may be used to solve the problem that the conventional U-net model cannot directly process high-definition images. Special convolution may be used to solve the problems of fish scales and large network model. The modified U-net structure may be used to solve the problem of poor inpainting results when the object region to be removed is large.

As shown in FIG. 11, when performing image processing method 1100, operation S1110 may include operation S1111 of adjusting the pixel value of an object region to be removed selected by the user to 0 according to the object region to be removed selected by the user (i.e., the object region to be removed), and the white region in the image shown in the figure being the object region to be removed. Operation S1110 may further include operation S1112 of predicting the most suitable bounding box based on semantic information, the bounding box being the candidate rectangular box described in the foregoing, and the most suitable bounding box is the object candidate box. Operation S1110 may further include operation S1113 of clipping the preprocessed original image by using the screened most suitable bounding box to obtain an image to be processed including the object region to be removed and generating a mask image corresponding to the image to be processed.

Among them, the image clipping based on semantic information can refer to the corresponding description in the foregoing, and the description will not be repeated here.

After obtaining the image to be processed and the corresponding mask image, the image to be processed and the corresponding mask image may be input into the image inpainting network, and the inpainting result, i.e., the inpainting result shown in FIG. 11, may be obtained based on the output of the network.

If the clipped image is scaled in the process of clipping the image based on semantic information, after obtaining the inpainting result of the image inpainting network, the super resolution processing may be performed on the inpainting result to obtain the result R shown in the figure.

The specific steps of super-resolution processing may be referred to the corresponding description in the previous text and will not be repeated here.

After the above result R is obtained, the result R may be spliced with the image from the original image with the clipped region removed to obtain the splicing result, and the object removal (also referred to as object inpainting) may be completed.

The conventional image inpainting network may have the problem of the occurrence of "fish scale phenomenon" in the inpainting result, the problem that the region to be removed cannot be completely reconstructed due to large region to be removed, and the problem of large model size. In order to solve these problems, embodiments may use a special depth gated convolution (Depth-Gated Cony) for image inpainting to reduce the problem of "fish scale phenomenon" in the image inpainting results and solve the problem of large image inpainting network model.

In an embodiment, based on U-net, the convolution structures of the encoding part, for example an encoding network, and decoding part, for example a decoding network, of the conventional U-net structure may be implemented by depth gated convolution, which solves the problems that the conventional network structure may not be reconstructed and the model is too large when the area of the object region to be removed is large, and may improve the problem that the inpainting result includes "fish scale phenomenon". In addition, a random noise may be added in the upsampling of the decoding part of U-net, which further reduces the problem that the inpainting result includes "fish scale phenomenon".

Figure 12:
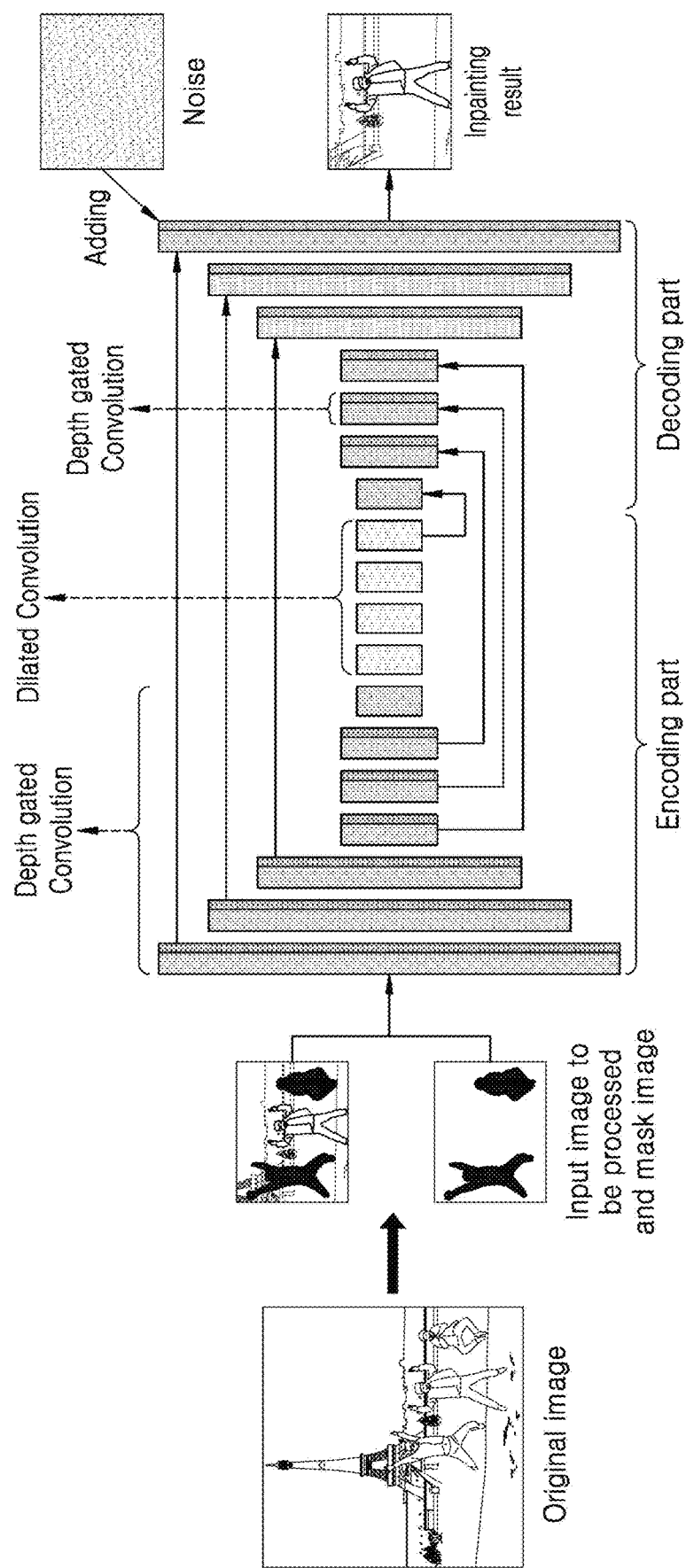
FIG. 12 illustrates a schematic structural diagram of an image inpainting network according to an embodiment.

FIG. 12 illustrates a schematic structural diagram of an image inpainting network according to an embodiment of the present application. As shown in FIG. 12, the image inpainting network may include an encoding part and a decoding part, and both the downsampling operation of the encoding part and the upsampling operation of the decoding part may be implemented using a depth gated convolution structure. Specifically, the encoding part uses the operation of depth gated convolution to realize the downsampling operation and extracts the high-dimensional features of the data according to the input image to be processed and the corresponding mask image. The downsampling rate of the downsampling operation may be realized by the stride of the depth gated convolution, for example, the depth gated convolution with the stride of 2 may reduce the data size by half each time of downsampling. The decoding part may use the depth gated deconvolution to realize upsampling operation, wherein the upsampling operation can choose nearest neighbor interpolation or bilinear interpolation for upsampling. After that, the output layer after upsampling may finally complete the image inpainting by adding random noise data (e.g., a random gaussian noise) with the same pixel size as the output image.

As shown in FIG. 12, the encoding part in this example includes seven first convolution modules and four second convolution modules which are cascaded in sequence. In this example, the downsampling rate of each second convolution module in the encoding part is 1, only the fusion feature map output by the last second convolution module among the fusion feature maps may output by the last first convolution module and second convolution modules may be used in the decoding part, and the decoding part may include seven first convolution modules cascaded in sequence. The first convolution module may adopt a conventional convolution processing method or a dilated convolution processing method, and each first convolution module may obtain a fusion feature map of each layer based on the fusion feature extraction method according to an embodiment of the application. The second convolution module may output the fusion feature map based on the fusion feature map output by the last first convolution module in a dilated convolution processing manner, while the decoding part, i.e., each first convolution module of the decoding network, may realize upsampling operation through convolution processing based on the fusion feature maps of layers extracted by each first convolution module and second convolution modules of the encoding part to obtain the preliminarily inpainting result. Specifically, in this example, for each convolution module of the decoding part, the input of the first convolution module on the left is the output of the last second convolution module, and the input of each convolution module of the decoding part other than the first convolution module on the left may include the fusion feature map output by the convolution module of the encoding part corresponding to the convolution module and the output feature map of the convolution module on the left side of the convolution module.

It can be understood that embodiments are not limited to the image inpainting network structure shown in FIG. 12. In the fusion feature maps output by convolution modules of the encoding part, the convolution modules being used for the decoding part may be configured according to actual requirements. For example, for the structure in FIG. 12, for feature maps output by the last convolution module and second convolution modules, a plurality of feature maps may be used for the decoding part. When the image sizes of the feature maps are the same, the feature maps with the same sizes may be taken as inputs of corresponding convolution modules in the decoding network, or convolution modules of decoding parts corresponding to convolution modules used for extracting the feature maps in the encoding network may be respectively set, and feature maps may be taken as outputs of convolution modules corresponding to the decoding part respectively.

In order to obtain a better image inpainting effect, a noise image (labeled Noise in FIG. 12) with the same size as the image to be processed may be generated. Based on the noise image and the preliminarily inpainting result, a further inpainting result may be obtained. An example of further processing based on the noise image will be described in detail below.

Figure 13:
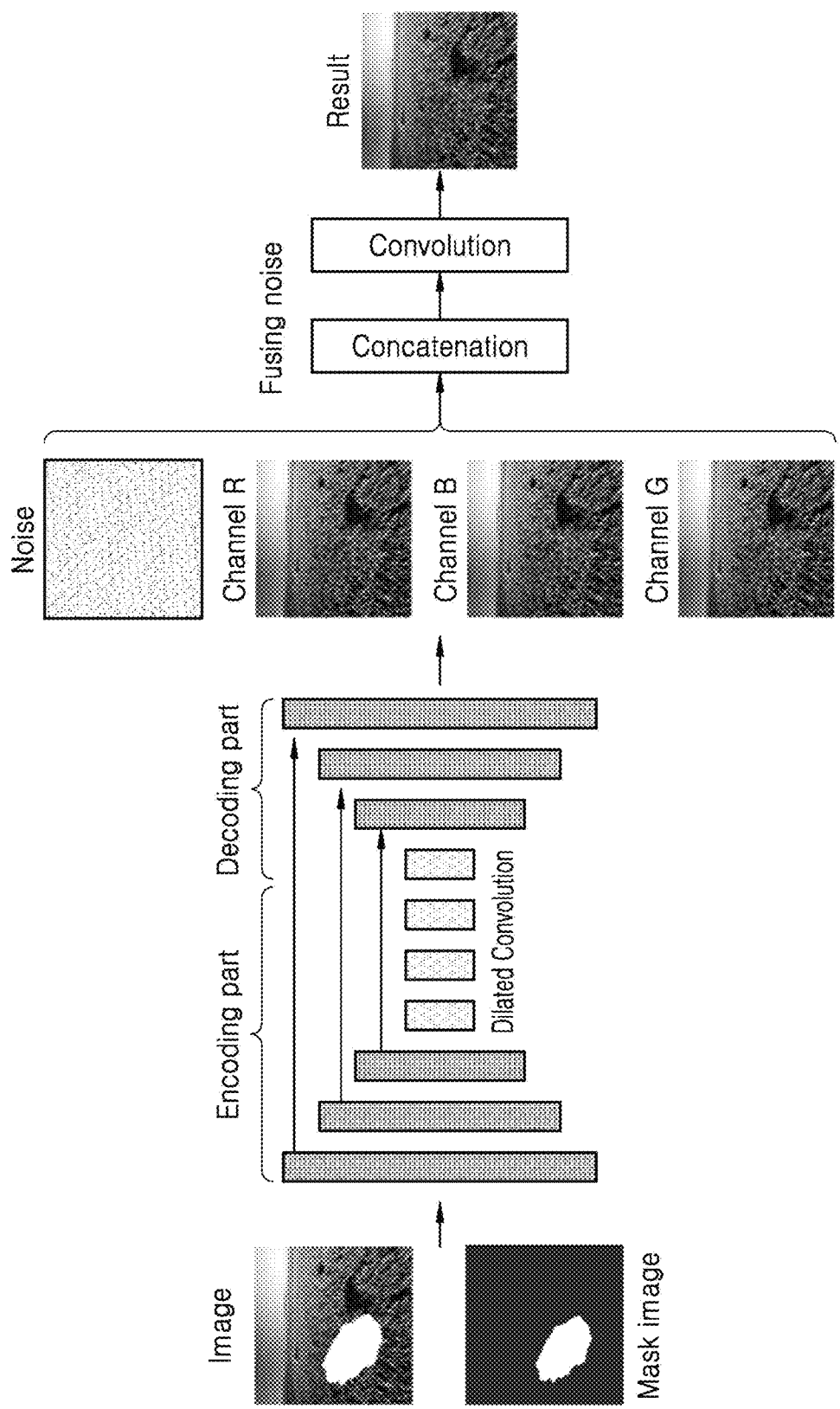
FIG. 13 illustrates a schematic structural diagram of an image inpainting network according to another embodiment.

FIG. 13 illustrates a schematic structural diagram of another image inpainting network provided by the present application. As shown in FIG. 13, the encoding part of the image inpainting network includes three first convolution modules and four second convolution modules which are cascaded in sequence, and the decoding part includes three first convolution modules which are cascaded in sequence. In an embodiment, the first convolution module may use a conventional convolution processing method to obtain fusion feature maps of all layers, while the second convolution module may use a dilated convolution processing method to extract fusion feature maps of all layers. Moreover, the decoding part may realize upsampling operation through convolution processing based on the fusion feature maps of all layers extracted by the first convolution module and the second convolution module to obtain a preliminary inpainting result (for example the three images of R, G and B channels shown in FIG. 13). Similarly, after the preliminary inpainting result is obtained, a further inpainting result (labeled Result in FIG. 13) may be obtained based on the image and the noise image Noise. When the preliminary inpainting result and the noise image are fused, the fusion may be performed through a concatenation layer (also referred to as a combining layer) and a convolution layer (for example Conv2D) shown in the figure.

It can be understood that in practical application, the dilated convolution processing method and the depth gated convolution structure may be adopted simultaneously, may be adopted in only one convolution module, may be adopted in multiple convolution modules or all convolution modules. As for the inpainting network structure shown in FIGS. 12 and 13, one or more or all of the first convolution modules of the encoding part and decoding part may adopt a depth gated convolution structure and/or adopt a dilated convolution processing method.

Figure 14:
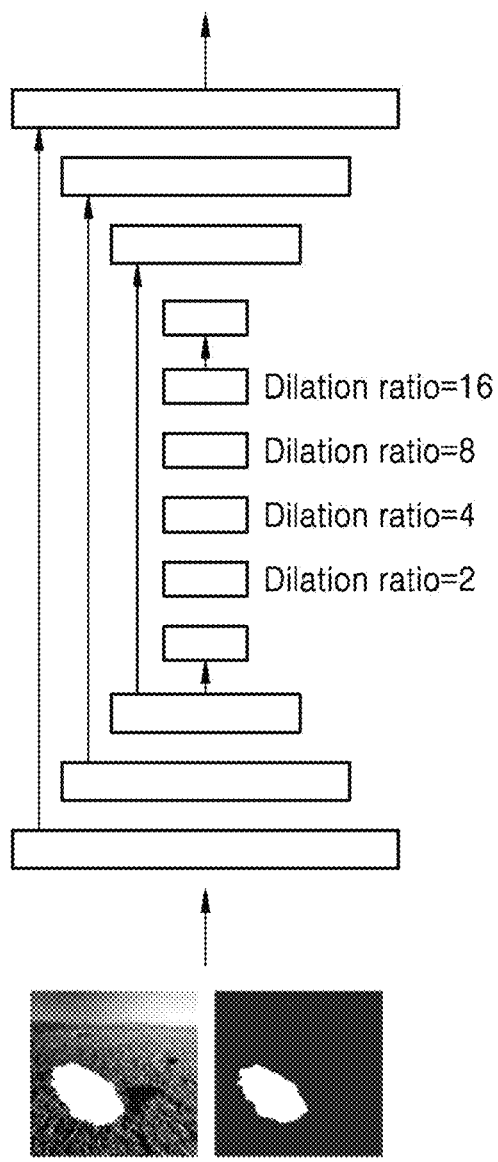
FIG. 14 illustrates a schematic structural diagram of an image inpainting network according to yet another embodiment.

As an example, FIG. 14 illustrates a schematic structural diagram of four second convolution modules (i.e., dilated convolution modules) shown in FIG. 12 or FIG. 13. Among them, each dilated convolution module may be a depth gated convolution based on a dilated convolution mechanism or a conventional gated convolution structure based on a dilated convolution mechanism. Based on this structure, a fusion feature map of four layers, in which the image information to be processed and the mask image information are fused, may be extracted, wherein the dilation ratio of the dilated convolution structure of all layers may be the same or different. In this example, the dilation ratio of each layer gradually increases. As shown in FIG. 14, the dilation ratio of each layer may be set to 2, 4, 8 and 16. By adopting a dilated convolution processing method, each element point in the extracted feature map may extract the feature information of the original image, and the final image inpainting effect may be further improved.

The depth gated convolution structure provided by the embodiment of the application can solve the problem of "fish scale phenomenon" in image inpainting results to a great extent, but "fish scale phenomenon" may still occur in some actual scenes. In order to further avoid the occurrence of this phenomenon, after the inpainting result is obtained based on the image inpainting network, noise images can be fused into the inpainting result to destroy the regular texture appearing in the "fish scale phenomenon" to further reduce this phenomenon.

As an example, the flow of an image processing method according to an embodiment of the present application will be described below with reference to FIG. 13. As shown in FIG. 13, after completing the preliminary inpainting of the image to be processed through the image inpainting network (the encoding part and decoding part shown in the figure), the method may also add the noise image fusion after the decoding part. Specifically, random noise data with the same pixel size as the output image, i.e. the noise image Noise shown in the figure, may be added to the output layer of the decoding part, and the noise image and the decoded output images of R, G and B channels may be combined, then the effect of destroying the regular texture may be achieved through convolution operation, and a better inpainting result may be obtained.

After the inpainting result is obtained, if the clipped image is scaled during the image clipping process, the image maybe to be subjected to super-resolution processing according to the corresponding scaling ratio to obtain an image with the same size as that before scaling, and the super-resolution processed image may be spliced with other regions in the original image except the clipped region to obtain the final complete image with the object removed. If the clipped image is not scaled, the inpainting result may be directly spliced with other regions in the original image except the clipped region.

Figure 15A:
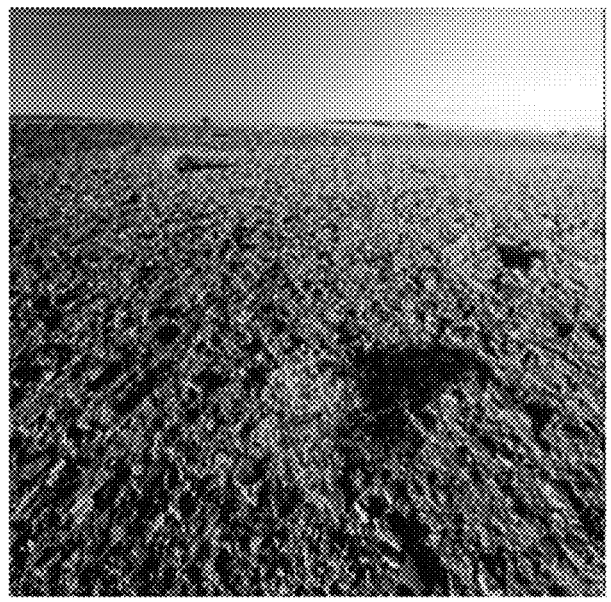
FIG. 15A illustrates an original image to be processed according to an embodiment.
Figure 15B:
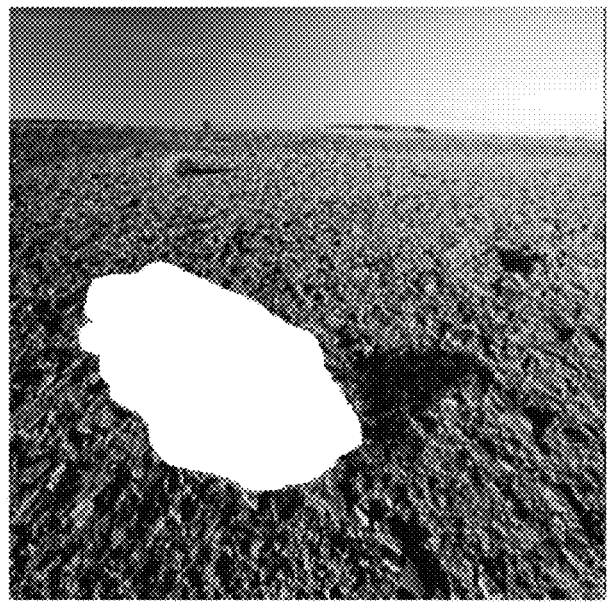
FIG. 15B illustrates an image obtained after preprocessing the image in FIG. 15A.
Figure 15C:
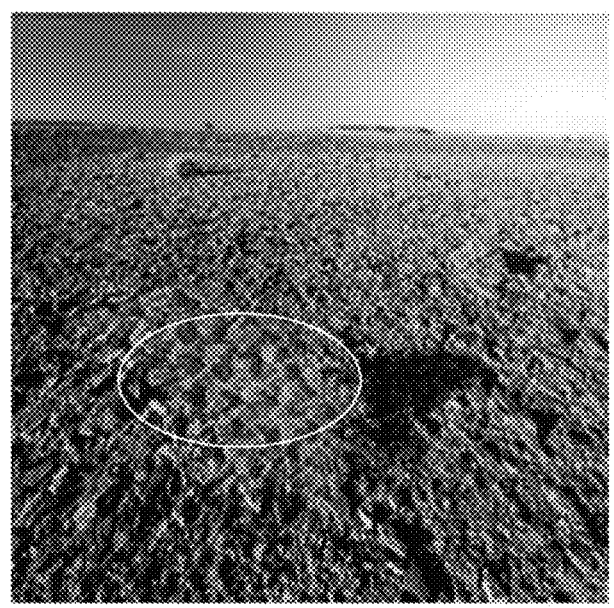
FIG. 15C, FIG. 15D and FIG. 15E respectively illustrate schematic result diagrams obtained after performing object removal on the original image in FIG. 15A based on the conventional gated convolution mechanism, the conventional partial convolution mechanism and the depth gated convolution mechanism according to an embodiment.
Figure 15D:
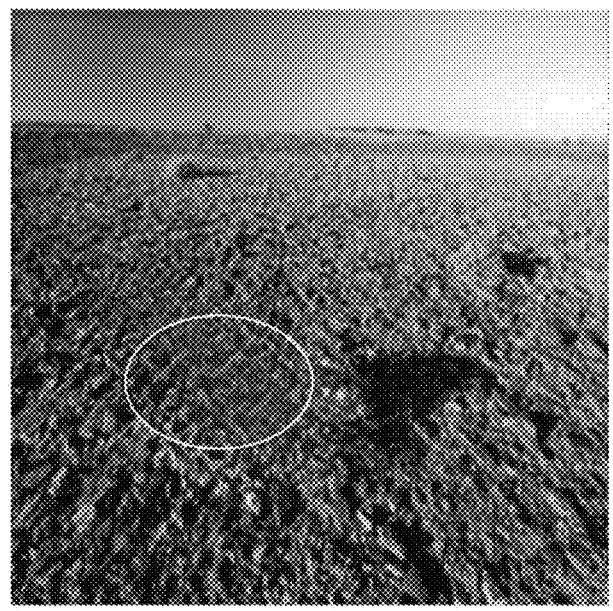
Figure 15E:
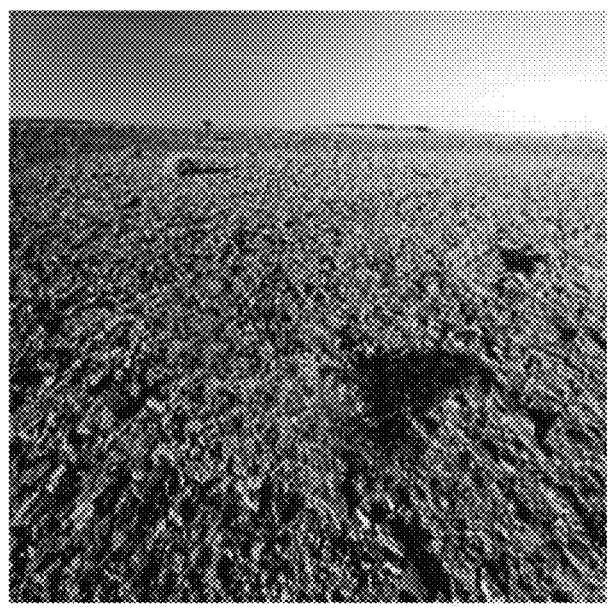

FIGS. 15A-15E illustrate embodiments relating to the problem of "fish scale phenomenon". For example, FIG. 15A may show an original image, and FIG. 15B shows the image after preprocessing the image in FIG. 15A. For example, the image region corresponding to the white region in FIG. 15B is the object region to be removed, and the pixel value in this region becomes 0 after preprocessing. According to embodiments, FIG. 15C shows the effect of object removal on the image shown in FIG. 15A based on the conventional gated convolution structure, FIG. 15D shows the effect of object removal on the image shown in FIG. 15A based on the conventional partial convolution structure. and FIG. 15E shows the effect of object removal on the image shown in FIG. 15A based on the depth gated convolution structure according to an embodiment of the application. As can be seen from FIGS. 15C to 15E, there is an obvious "fish scale phenomenon" in the image reconstructed based on the conventional gated convolution structure, i.e., the region corresponding to the white circle in FIG. 15C. Although the image inpainting result based on the partial convolution structure (i.e., FIG. 15D) is greatly improved compared with FIG. 15C, there are still some "fish scale phenomena", i.e., the region corresponding to the white circle in FIG. 15D. As can be seen from FIG. 15E, in the image inpainting results based on the depth gated convolution structure provided by the present application, there is no "fish scale phenomenon" visible to naked eyes, and the image inpainting results have been greatly improved.

Figure 16A:
FIG. 16A illustrates an original image to be processed according to another embodiment.
Figure 16B:
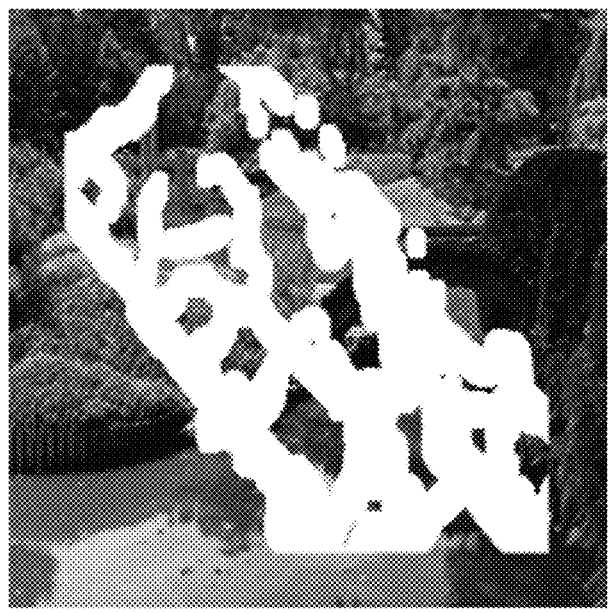
FIG. 16B illustrates an image obtained after preprocessing the image in FIG. 16A.
Figure 16C:
FIG. 16C, FIG. 16D and FIG. 16E respectively illustrate schematic result diagrams obtained after performing object removal on the original image in FIG. 16A based on the conventional gated convolution mechanism, the conventional partial convolution mechanism and the depth gated convolution mechanism according to an embodiment.
Figure 16D:
Figure 16E:

FIGS. 16A-16E illustrate embodiments relating to scenes where the area of the object region to be removed is relatively large. For example, FIG. 16A may show an original image, and FIG. 16B shows the image after preprocessing the image in FIG. 16A. For example, the image region corresponding to the white region in FIG. 16B is the object region to be removed, and the pixel value in this region becomes 0 after preprocessing. According to embodiments, FIG. 16C shows the effect of object removal on the image shown in FIG. 16A based on the conventional gated convolution structure, FIG. 16D shows the effect of object removal on the image shown in FIG. 16A based on the conventional partial convolution structure, and FIG. 16E shows the effect of object removal on the image shown in FIG. 16A based on the depth gated convolution structure provided in the embodiment of the present application. From FIG. 16C to FIG. 16E, it can be seen that in the image inpainting results of the prior art, there are obvious unreconstructed regions and traces of manual inpainting, such as the regions corresponding to white circles in FIG. 16C and FIG. 16D, while the inpainting result based on the depth gated convolution structure provided by the present application are relatively natural, as shown in FIG. 16E, the image inpainting effect has been greatly improved.

Figure 17A:
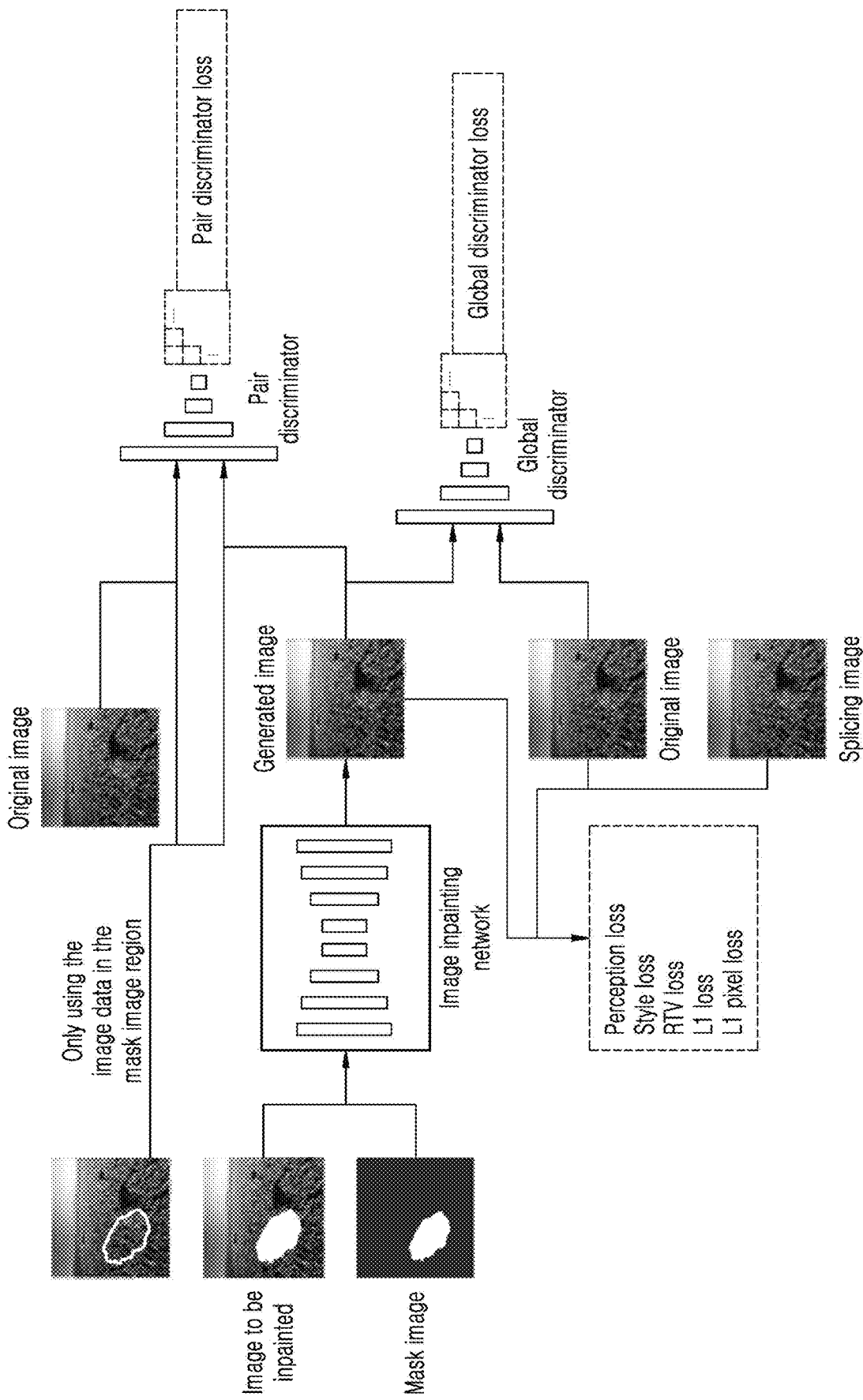
FIG. 17A illustrates a schematic principle diagram of a solution for training the image inpainting network according to an embodiment.

For the image inpainting network provided in embodiments of the present application, the training method of the network is not limited to the described embodiments. For example, in embodiments, in order to better ensure the image inpainting effect, the training of the image inpainting network can adopt the generative adversarial network architecture. Specifically, as shown in FIG. 17A, a Spectral Normalization for Generative Adversarial Network (SN-GAN) architecture can be adopted. An image inpainting network, taken as a generation network, may be adversarially trained with two discriminators (pair discriminator, also called local discriminator, and global discriminator) networks. Wherein, the input of the global discriminator may be consistent with the conventional SN-GAN, and the input of the pair discriminator may be a pair of images. The pair discriminator and the global discriminator are two classification networks, which are used for discriminating whether the images generated by the image inpainting network are original images or not, and accordingly, the discriminator loss reflects a probability of whether the images generated by the image inpainting network are original images, that is, the difference between the generated images and the original images.

According to embodiments of the present application, when training is performed by using the network architecture of SN-GAN, the generation network (i.e., image inpainting network) and the discrimination network (i.e., pair discriminator or global discriminator) may adopt an alternate training mode, which is a process of continuously iterating and updating with each other, and the pair discriminator and the global discriminator may be separately trained. Specifically, when the global discriminator is trained, the network weight of the image inpainting network may be fixed. When the image inpainting network is trained, the network weight of the global discriminator may be fixed. In the training process in which the global discriminator participates, the pair discriminator may not participate in the training. Similarly, when the pair discriminator is trained, the network weight of the image inpainting network may be fixed. When the image inpainting network is trained, the network weight of the pair discriminator is fixed, and in the training process in which the pair discriminator participates, the global discriminator may not participate in the training.

During training, the image to be reconstructed in the training sample (corresponding to the image to be processed) and the mask image of the image are input to the image inpainting network for forward propagation to obtain the generated image, and the generated image is input to the global discriminator to obtain a global discriminator loss. At the same time, the image data only containing mask image in the generated image and the original image (the complete image corresponding to the image to be reconstructed, that is, the complete image that is not required to be reconstructed in the sample) is input to the pair discriminator to obtain a pair discriminator loss.

In practical applications, the selection of loss function can be configured according to actual requirements. As an alternative, the image inpainting loss can use a conventional perception loss, a style loss, an L1 loss, etc. The pair discriminator loss and the global discriminator loss may use a conventional hinge loss or a cross entropy loss, etc.

When the generation network (i.e., the image inpainting network) is trained, the weight of the discrimination network (pair discriminator or global discriminator) may be fixed, so that the discriminator loss can be obtained, which indicates a probability that the generated data is real data. When the discrimination network is trained, the weight of the generation network may be fixed, so that negative sample data can be acquired according to the generation network, which can be used to train the ability that the discrimination network discriminates the data being a generated image or an original image.

In addition, in the image inpainting, if the solution of element value exchange and/or element value adjustment is performed on the object map as described in the foregoing, the embodiment of the present application also provides a random total variation loss (RTV loss) function when training the image inpainting network. The RTV loss function may be used to obtain the RTV loss, which may be used to update the weight of the image inpainting network. The RTV loss characterizes the difference between the object map subjected to the element value exchange and/or the element value adjustment and the original image corresponding to the object map (the original image does not includes the region need to be reconstructed). For example, if the object map is an image output by the image inpainting network, the loss characterizes the difference between the image, output by the image inpainting network and subjected to the element value exchange and/or the element value adjustment, and the corresponding original image.

Taking the random exchange of element values (i.e., pixel values) of the image output by the image inpainting network as an example, the RTV loss function can be defined as shown in Equations 3-5 below:

$$I_{\hat{y}}^{\substack{i \in (0, w_{\hat{y}}-a) \\ j \in (0, h_{\hat{y}}-b)}} \odot I_{noise1} + I_{\hat{y}}^{\substack{i \in (a, w_{\hat{y}}) \\ j \in (b, h_{\hat{y}})}} \odot (I_{11} - I_{noise1}) = I_{\hat{y}1} \quad \text{(Equation 3)}$$

$$I_{\hat{y}1}^{\substack{i \in (0, w_{\hat{y}1}-c) \\ j \in (0, h_{\hat{y}1}-d)}} \odot I_{noise2} + I_{\hat{y}1}^{\substack{i \in (c, w_{\hat{y}1}) \\ j \in (d, h_{\hat{y}1})}} \odot (I_{12} - I_{noise2}) = I_{output} \quad \text{(Equation 4)}$$

$$RTV_{loss} = \sum \frac{\|I_{comp'} - I_{pos}\|_1}{N_{I_{pos}}} \quad \text{(Equation 5)}$$

It can be seen from the formula that the RTV loss (i.e., $RTV_{loss}$) in this example is in the L1 loss-based form. It can be understood that the specific form of the RTV loss can be configured in different forms as required, as long as it can reflect the physical meaning to be characterized.

Wherein, $I_{\hat{y}}$ is the output result of the image inpainting network (the generated image shown in FIG. 17A), the width and the height of which are $w_{\hat{y}}$ and $h_{\hat{y}}$ and a and b are the selected clipping width threshold, generally as 2 (width of two pixels) and 1 (height of one pixel). $I_{noise1}$, is an image randomly generated with the width and height being $w_{\hat{y}}-a$ and $h_{\hat{y}}-b$, having values of 0 and 1, and having the same channel data with $I_{\hat{y}}$, i.e., the first weight map described in the foregoing. $\odot$ represents point multiplication of the corresponding elements. "+" and "−" correspond to the addition and subtraction of corresponding elements, respectively. $I_{11}$ indicates an image having all the element values of 1, and same width, height, and channel number with $I_{noise1}$, that is, the second weight map described in the foregoing. Similarly, the width and height of $I_{\hat{y}1}$ (the image on which the second element value exchange and/or adjustment is based, corresponding to the image Y in FIG. 10D) are $w_{\hat{y}1}$ and $h_{\hat{y}1}$. c and d are the selected clipping thresholds that are generally 0 and 1 (width of one pixel). $I_{noise2}$ is the first weight map corresponding to $I_{\hat{y}1}$. $I_{12}$ indicates an image having all the element values of 1, and same width, height, and channel number with $I_{noise2}$. $I_{output}$ is the image after element value exchange, and the image width and height of $I_{output}$ are $w_{\hat{y}}-a-c$ and $h_{\hat{y}}-b-d$, respectively.

$I_{comp'}$ and $I_{pos}$ in the formula can respectively represent $I_{output}$ and the image after corresponding clipping to the original image. For example, if the original image (the original image in the sample) from which the mask area is removed is X, its width and height are the same as the image to be reconstructed, that is, $w_{\hat{y}}$ and $h_{\hat{y}}$. The image X can be clipped as an image $I_{pos}$ having the width of [0, $w_{\hat{y}}a-c$] and the height of [0, $h_{\hat{y}}b-d$], or the width of [a, $h_{\hat{y}}-c$] and height of [b, $h_{\hat{y}}-d$] or others, which has the same size with $I_{output}$, and $N_{I_{pos}}$ is number of element points in $I_{pos}$. Then, $RTV_{loss}$ is the ratio of the sum of the absolute values of the differences of the element values of the element points in the corresponding locations in $I_{comp'}$ and $I_{pos}$ and $N_{I_{pos}}$.

$I_{comp'}$ and $I_{pos}$ in the formula can also respectively represent an image after the image $I_{output}$ is complemented and the original image, that is, $I_{pos}$ is the original image and $I_{comp'}$ is an image obtained by complementing the image after the element value exchange processing. Wherein, the data to be complemented can be complemented data $I_{crop}$ obtained from clipping with the width being [0, $w_{\tilde{y}}$-a-c] and the height being [0, $h_{\tilde{y}}$b-d], the width being [a, $h_{\tilde{y}}$-c] and the height being [b, $h_{\tilde{y}}$-d] or other forms in the image X. That is, the part of the original image other than the image of the same size with $I_{output}$ after clipping is $I_{crop}$, $I_{comp'}$ is obtained by splicing $I_{crop}$ and $I_{output}$, and at this time, $N_{I_{pos}}$ is the number of element points in the original image.

During training, the stitched image, the original image and the generated image can be input into a VGG (Visual Geometry Group) network, and the perception loss and the style loss are obtained by extracting and computing the feature maps of different layers in the VGG network. The L1 loss is obtained by subtracting the absolute value of the original image from the generated image and dividing by the number of pixels. The generated image is input into the pair discriminator and the global discriminator, and the outputs of the two discriminators are the pair discriminator loss and the global discriminator loss. Understandably, the above losses are only used for training a generation network.

In an embodiment, when training the image inpainting network, the overall loss function of the image inpainting network can be as shown in Equation 6 below:

$$\mathcal{L}_{total} = \lambda_1 \mathcal{L}_{pre} + \lambda_2 \mathcal{L}_{style} + \lambda_3 \mathcal{L}_{per\text{-}pixel} + \lambda_4 \mathcal{L}_{global} + \lambda_5 \mathcal{L}_{pair} + \lambda_6 \mathcal{L}_{RTV} \quad \text{(Equation 6)}$$

As another alternative, the overall loss function of the image inpainting network can be as shown in Equation 7:

$$\mathcal{L}_{total} = \lambda_1 \mathcal{L}_{pre} + \lambda_2 \mathcal{L}_{style} + \lambda_3 \mathcal{L}_{per\text{-}pixel} + \lambda_4 \mathcal{L}_{global} + \lambda_5 \mathcal{L}_{pair} \quad \text{(Equation 7)}$$

In the above two expressions, $\mathcal{L}_{total}$ represents the overall loss function, $\mathcal{L}_{prc}$ represents the perception loss, $\mathcal{L}_{style}$ represents the style loss, $\mathcal{L}_{per\text{-}pixel}$ represents the L1 loss, $\mathcal{L}_{global}$ represents the global discriminator loss, $\mathcal{L}_{pair}$ represents the pair discriminator loss, $\mathcal{L}_{RTV}$ represents the RTV loss, and $\lambda_1$ to $\lambda_6$ represent the weight proportion of losses, respectively. The training process for the image inpainting network can refer to the foregoing description.

A possible solution is shown in Equations 8 and 9:

$$\mathcal{L}_{global} = E[D_G(I_{output})] + 1; \quad \text{(Equation 8)}$$

$$\mathcal{L}_{pair} = E[D_{pair}(I_{output}, I_{gt\_mask\_region})] + 1 \quad \text{(Equation 9)}$$

Wherein, $D_G(I_{output})$ represents the output feature map of the global discriminator when the image inpainting network is trained, and the input of the global discriminator is the output image of the image inpainting network and the corresponding original image. $E[D_G(I_{output})]$ represents the average of the element values of the elements in the output feature map. Similarly, $D_{pair}$ (I_output) $I_{gt\_mask\_region}$) represents the output feature map of the pair discriminator, and the input of the pair discriminator is the two image pairs described above, that is, the output image of the image inpainting network and the image containing only the mask region in the original image ($I_{gt\_mask\_region}$), and the original image and the image containing only the mask region in the original image corresponding to the output image of the image inpainting network.

Figure 17B:
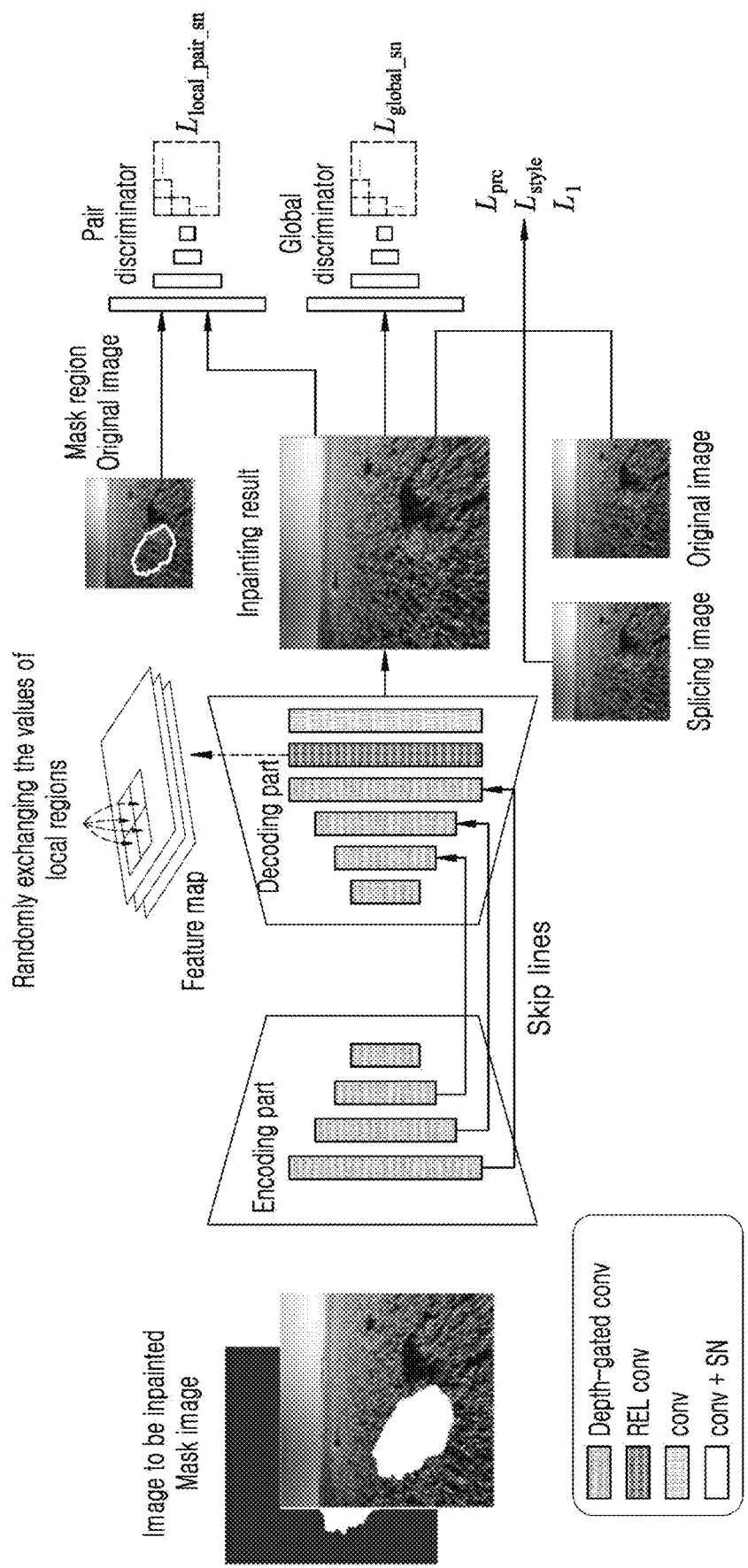
FIG. 17B illustrates a schematic flowchart of a solution for training the image inpainting network according to an embodiment.

As an example, FIG. 17B illustrates a schematic principle diagram of performing training on an image inpainting network according to an embodiment. The step of exchanging image element values (randomly exchanging the values of local regions shown in the figure) may be taken as a part of the image inpainting network. As shown in FIG. 17B, in this example, the process is after the upsampling process of the decoding part, that is, after the preliminarily inpainting result is obtained. The decoding part may include a depth gated convolution structure, a Randomly exchange local value (REL conv), and a final convolution layer for smoothing processing, in which REL conv is the structure for random processing of element values. When the image inpainting network is trained, the global discriminator loss and the pair discriminator loss may be fixed, and the image to be reconstructed in the sample and the corresponding mask image may be input to the image inpainting network. The image output by the image inpainting network (inpainting result shown in FIG. 17B) and the mask region image (the image only taking the image data in the mask image region shown in FIG. 17B), as a pair of inputs, and the original image and the mask region image, as another pair of inputs, are input to the pair discriminator. The image output by the image inpainting network and the corresponding original image may be input to the global discriminator, and the network may be trained based on the overall loss function $\mathcal{L}_{total}$ of the image inpainting network until the loss function converges.

When the global discriminator is trained, the weight of the image inpainting network may be fixed, the image to be reconstructed and the corresponding mask image may be input to the image inpainting network for forward propagation to obtain the generated image. The image is taken as a negative sample, and the original image is taken as a positive sample, then the global discriminator's network weight may be updated using a global discriminator loss function (such as a hinge loss function).

In an embodiment, when the global discriminator is trained, the loss function of the global discriminator can be expressed as Equation 10 below:

$$\mathcal{L}_{D\_global\_SN} = E[\max(0, 1 - D_{global}(I_{gt})) + \max(0, 1 + D_{global}(I_{output}))] \quad \text{(Equation 10)}$$

Wherein, $\mathcal{L}_{D\_global\_SN}$ is the loss function of the global discriminator, $D_{global}(I_{gt})$ represents a normalized feature map of the original image after being processed by the global discriminator, $D_{global}(I_{output})$ represents a normalized feature map of the output image of the image inpainting network after being processed by the global discriminator, 1 represents image having the same size as the original image having all the element values of 1, "+" and "−" in the formula respectively represent the subtraction and addition of the values of the corresponding element points, and E represents an average of the element values of all the element points.

Similarly, when the pair discriminator is trained, the weight of the image inpainting network may be fixed, and the image to be reconstructed and the mask image may be input to the image inpainting network for forward propagation to obtain the generated image. The image within the mask in the original image and the original image, as a pair of data, are taken as positive samples, the image within the mask in the original image and the generated image, as a pair of data, may be taken as negative samples, and the network weight of the pair discriminator may be updated using the pair discriminator loss function (such as the hinge loss function). The image inpainting network obtained after completing the training of the entire network architecture may be used as a repair network in the actual image inpainting application.

In an embodiment, when the pair discriminator is trained, the loss function of the pair discriminator can be expressed as Equation 11 below:

$$\mathcal{L}_{D\_pair\_SN} = E[\max(0, 1 - D_{pair}(I_{gt}, I_{gt\_mask\_region})) + \max(0, 1 + D_{pair}(I_{output}, I_{gt\_mask\_region}))] \quad \text{(Equation 11)}$$

Wherein, $\mathcal{L}_{D\_pair\_SN}$ is the loss function of the pair discriminator, $D_{pair}(I_{gt}, I_{gt\_mask\_region})$ represents a normalized feature map of the pair of images of the original image and the mask region image after being processed by the global discriminator, $D_{pair}(I_{output}, I_{gt\_mask\_region})$ represents a normalized processed feature map output by the pair of images of the output image of the image inpainting network and the mask are image after being processed by the global discriminator, 1 represents image having all the element values of 1 and having the same size as the original image, "+" and "−" in the formula respectively represent the subtraction and addition of the values of the corresponding element points, and E represents an average of the element values of all the element points.

Figure 18:
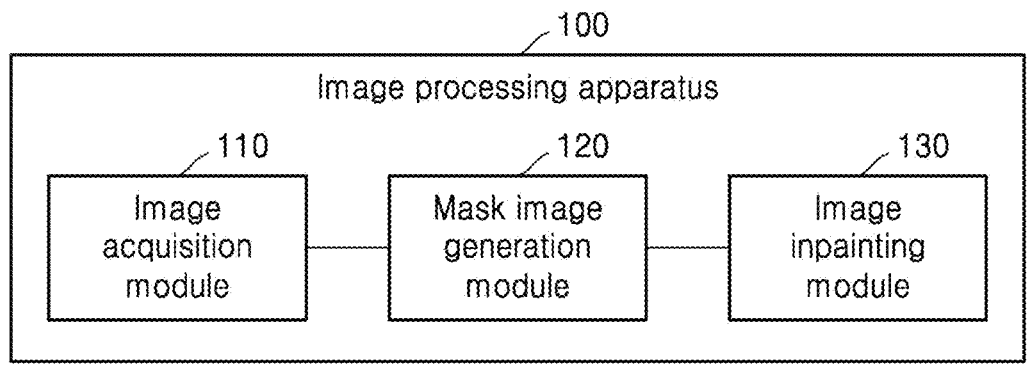
FIG. 18 illustrates a schematic structural diagram of an image processing apparatus according to an embodiment.

Based on the embodiment of the present application described above, in an embodiment of the present application an image processing apparatus may be provided. As shown in FIG. 18, the image processing apparatus 100 may include an image acquisition module 110, a mask image generation module 120, and an image inpainting module 130. For example, the image acquisition module 110 may be configured to acquire an image to be processed including an object region to be removed. In addition, the mask image generation module 120 may be configured to generate a mask image of the image to be processed. Further, the image inpainting module 130 may be configured to recover the object region to be removed in the image to be processed according to the image to be processed and the mask image to obtain an inpainting result.

In an embodiment, the image inpainting module 130 may be specifically used for: extracting a fusion feature map corresponding to the image to be processed through an encoding network according to the image to be processed and the mask image; and inpainting the object region to be removed in the image to be processed through a decoding network to obtain an inpainting result based on the fusion feature map.

In an embodiment, the encoding network and the decoding network may respectively include at least one first convolution module.

Each first convolution module may perform convolution processing according to the input fusion feature map and outputs the fusion feature map obtained by convolution processing.

In an embodiment, the encoding network may further include at least one second convolution module cascaded with the last first convolution module of the encoding network.

The second convolution module may perform convolution processing in a dilated convolution processing manner according to the input fusion feature map, and output the fusion feature map obtained by convolution processing.

In an embodiment, if there are at least two second convolution modules, the second convolution modules may be cascaded in sequence, and the convolution parameters of the at least two second convolution modules may be different.

In an embodiment, when at least one convolution module performs convolution processing according to the input fusion feature map and outputs the fusion feature map obtained by convolution processing, it can be specifically used for: performing a first convolution processing according to the input fusion feature map to extract a corresponding image feature map; performing a second convolution processing based on the input fusion feature maps with the first channel number to extract the mask feature maps with the second channel number, wherein the mask feature map of each channel is obtained based on the feature map of at least one channel in the input fusion feature maps, and the channel number of at least one channel is smaller than the first channel number; and fusing the image feature map and the mask feature map and outputting the result of the fusion.

In an embodiment, the convolution module may be further configured to convert the input fusion feature map into the fusion feature maps with the second channel number, if the first channel number is not equal to the second channel number before performing a second convolution process based on the input fusion feature maps with the first channel number to extract the mask feature maps with the second channel number.

Correspondingly, when the convolution module performs a second convolution processing based on the input fusion feature maps with the first channel number to extract the mask feature maps with the second channel number, it may be specifically used to perform a second convolution processing, based on the feature map of each channel in the converted fusion feature maps with the second channel number, to extract the mask feature map corresponding to each channel.

In an embodiment, when the convolution module obtains the mask feature map of one channel based on the feature map of at least one channel in the input fusion feature maps, it may be specifically used for performing processing according to at least two convolution processing parameters, respectively, and extracting feature maps corresponding to at least two receptive fields, based on the feature map of at least one channel in the input fusion feature maps; and fusing the extracted feature maps corresponding to at least two receptive fields to obtain a mask feature map of one channel.

In an embodiment, when the image inpainting module 130 is configured to reconstruct the object region to be removed in the image to be processed according to the image to be processed and the mask image to obtain an inpainting result, it can be specifically used for: obtaining a preliminarily inpainting result based on the image to be processed and the mask image; generating a noise image with the same size as the image to be processed; and obtaining the inpainting result based on the preliminary inpainting result and the noise image.

In an embodiment, the image inpainting module 130 may be further configured to perform at least one of the following processing on the object map: randomly exchanging element values of element points in adjacent locations in the object map; and randomly adjusting element values of element points in the object map, wherein the object map is at least one fusion feature map and/or an inpainting result obtained through the decoding network.

In an embodiment, when the image inpainting module 130 randomly exchanges element values of element points in adjacent locations in the object map, the image inpainting module 130 may be specifically configured to: perform at least one of the following processing on the object map, and obtain a processed object map with the same size as the object map based on a map after the at least one processing:

performing a first edge clipping and a second edge clipping on the object map to obtain a first clipped map and a second clipped map; generating a first weight map corresponding to the first clipped map and a second weight map corresponding to the second clipped map, wherein element values of the element points in the first weight map and the second weight map are 1 or 0, and the element values of the element points of the same position in the first weight map and the second weight map are different; and fusing the first clipped map and the second clipped map based on the first weight map and the second weight map to obtain a processed map.

In an embodiment, when the image inpainting module 130 randomly adjusts element values of element points in the object map, the image inpainting module 130 may specifically be configured to: perform at least one of the following processing on the object map, and obtain a processed object map with the same size as the object map based on a map after the at least one processing: performing a third edge clipping and a fourth edge clipping on the object map to obtain a third clipped map and a fourth clipped map; performing feature extraction based on the third clipped map to obtain an adjustment coefficient of the fourth clipped map; and adjusting element values of element points in the fourth clipped map based on the adjustment coefficient to obtain a processed image.

In an embodiment, when the image acquisition module 110 is configured to acquire an image to be processed including an object region to be removed, it can be specifically used for: acquiring an original image including an object region to be removed; extracting image features of the original image; and performing clipping on the original image based on the image features of the original image to obtain the image to be processed including the object region to be removed.

In an embodiment, when the image acquisition module 110 is configured to perform clipping on the original image based on the image features of the original image to obtain the image to be processed including the object region to be removed, it can be specifically used for: determining candidate regions including the object region to be removed in the original image based on the image features of the original image; screening the object region from candidate regions; and performing clipping on the original image according to the screened object region to obtain the image to be processed including the object region to be removed.

In an embodiment, when the image acquisition module is configured to determine each candidate region including the object region to be removed in the original image based on the image features of the original image, it may be specifically used for: determining the region size of the object region to be removed; obtaining a candidate region with a first set region size according to the image features of the original image and the location information of the object region to be removed in the original image if the region size is not greater than a set threshold; and obtaining a candidate region with a second set region size according to the image features of the original image and the location information of the object region to be removed in the original image if the region size is greater than the set threshold.

In an embodiment, the image acquisition module may be specifically used for: clipping the original image according to the screened object region to obtain a clipped image with the second set region size when the screened object region is a candidate region with a second set region size; and scaling the clipped image according to the first set region size to obtain the image to be processed including an object region to be removed.

In an embodiment, the image inpainting module may be further used for: performing a corresponding scaling processing on the inpainting result to obtain an inpainting result with a second set region size based on the scaling ratio at which the clipped image is scaled after the inpainting result being obtained; and performing fusion processing on the inpainting result after the scaling processing and the original image to obtain the inpainting result corresponding to the original image.

It can be understood that each module of the image processing apparatus according to an embodiment of the present application may have a function of realizing corresponding steps in the image processing method according to an embodiment of the present application. The function may be implemented by hardware or may be implemented by hardware executing corresponding software. The above-mentioned modules can be software and/or hardware, and each module can be implemented separately or integrated with multiple modules. For the functional description of each module of the image processing apparatus, please refer to the corresponding descriptions in the image processing methods in the above-mentioned embodiments, which will not be repeated here.

Based on the embodiments discussed above, in an embodiment an electronic device, which includes a memory and a processor, may be provided. In an embodiment, the memory may be configured to store a computer program. The processor may be configured to execute the method shown in any embodiment of the present application when running the computer program.

Figure 19:
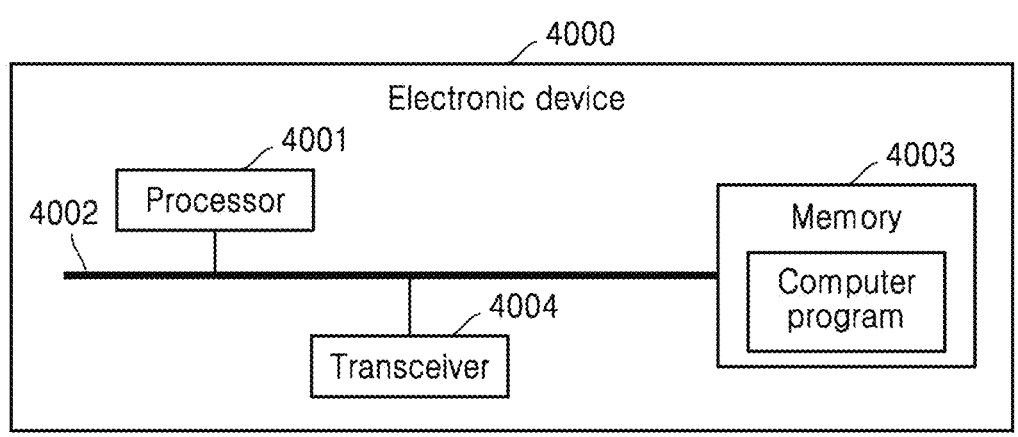
FIG. 19 is a schematic structural diagram of an electronic device provided according to an embodiment.

An embodiment of the present application may also provide a computer readable storage medium on which a computer program is stored, that executes the method shown in any embodiment of the present application when being processed and executed. FIG. 19 illustrates a schematic structural diagram of an electronic device according to an embodiment of the present application. As shown in FIG. 19, the electronic device 4000 may include a processor 4001 and a memory 4003. The processor 4001 and the memory 4003 may be connected, for example, via a bus 4002. In an embodiment, the electronic device 4000 may further include a transceiver 4004. It should be noted that the transceiver 4004 is not limited to one in actual application, and the structure of the electronic device 4000 is not limited to the embodiment of the present application.

The processor 4001 may be a Central Processing Unit (CPU), a general-purpose processor, a Digital Signal Processor (DSP), an Application Specific Integrated Circuit (ASIC), a Field Programmable Gated Array (FPGA) or other programmable logic devices, transistor logic devices, hardware components, or any combination thereof. Various exemplary logic blocks, modules, and circuits described in connection with the present disclosure may be implemented or executed. The processor 4001 may also be a combination that implements computing functions, such as a combination that includes one or more microprocessors, a combination of DSP and microprocessors, etc.

The bus 4002 may include a path to transfer information between the above components. The bus 4002 may be a Peripheral Component Interconnect (PCI) bus or an Extended Industry Standard Architecture (EISA) bus or the like. The bus 4002 can be divided into an address bus, a data bus, a control bus, etc. For ease of representation, the bus is expressed by only one thick line in FIG. 19, but it does not mean only one bus or one type of bus.

The memory 4003 may be a Read Only Memory (ROM) or other types of static storage device that can store static information and instructions, a Random Access Memory (RAM) or other types of dynamic storage device that can store information and instructions. It can also be an Electrically Erasable Programmable Read Only Memory (EEPROM), a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 4003 is configured to store application program codes for executing the solution of the present application, and the execution is controlled by the processor 4001. The processor 4001 is configured to execute the application program code stored in the memory 4003 to implement the contents shown in any of the foregoing method embodiments.

It should be understood that although various steps and operations in flowcharts and diagrams included in the drawings are shown in sequence as indicated by arrows, these steps are not necessarily executed in the sequence as indicated by arrows. Unless explicitly stated herein, the execution of these steps is not strictly limited in sequence but may be performed in other sequences. Moreover, at least a part of the steps or operations may include a plurality of sub-steps or stages or sub-operations, which are not necessarily completed at the same time, but may be executed at different times, and the execution order thereof is not necessarily sequentially, but may be executed in turn or alternately with at least a part of the sub-steps or stages of other steps or other steps.

The foregoing is only a partial embodiment of the present invention, and it should be noted that several modifications and refinements may be made to one of ordinary skill in the art without departing from the principles of the present invention, these improvements and finishes should also be considered to be within the scope of the present invention.

What is claimed is:

1. An image processing apparatus, comprising:
   at least one memory; and
   at least one processor coupled to the at least one memory and configured to implement:
      an image acquisition module configured to acquire an input image including an object region;
      a mask image generation module configured to generate a mask image based on the input image; and
      an image inpainting module configured to extract a fusion feature map corresponding to the input image using an encoding network according to the input image and the mask image, and to inpaint the object region in the input image using a decoding network based on the fusion feature map, to obtain an inpainting result,
   wherein at least one of the encoding network and the decoding network comprises at least one depth-gated convolution processor.

2. The apparatus according to claim 1, wherein the encoding network and the decoding network comprise at least one first convolution processor,
   wherein the at least one first convolution processor is configured to perform convolution according to an input fusion feature map and outputs the fusion feature map obtained by the convolution.

3. The apparatus according to claim 2, wherein the encoding network further comprises at least one second convolution processor cascaded with a last first convolution processor of the encoding network,
   wherein the at least one second convolution processor is configured to perform dilated convolution according to the input fusion feature map, and output the fusion feature map obtained by the dilated convolution.

4. The apparatus according to claim 3, wherein the at least one second convolution processor comprises a first-second convolution processor and a second-second convolution processor,
   wherein the first-second convolution processor is cascaded in sequence with the second-second convolution processor, and
   wherein a first convolution parameter of the first-second convolution processor is different from a second convolution parameter of the second-second convolution processor.

5. The apparatus according to claim 2, wherein the input fusion feature map is based on a plurality of channels, and
   wherein the at least one first convolution processor is further configured to:
      perform first convolution according to the input fusion feature map to extract a corresponding image feature map;
      perform second convolution based on the input fusion feature map to extract a mask feature map based on at least one channel, wherein a number of the at least one channel is smaller than a number of the plurality of channels;
      fuse the image feature map and the mask feature map; and
      output a result of the fusing.

6. The apparatus according to claim 5, wherein before the performing the second convolution, the at least one first convolution processor is further configured to, based on the number of the at least one channel being different from the number of the plurality of channels, convert the input fusion feature map into a converted fusion feature map based on the at least one channel, and
   wherein the second convolution is performed based on the converted feature map.

7. The apparatus according to claim 5, wherein the at least one first convolution processor is further configured to:
   perform processing according to at least two convolution processing parameters, and extract feature maps corresponding to at least two receptive fields, based on the input fusion feature map; and
   fuse the extracted feature maps corresponding to the at least two receptive fields to obtain the mask feature map.

8. The apparatus according to claim 1, wherein the image inpainting module is further configured to:
   obtain a preliminary inpainting result based on the input image and the mask image;
   generate a noise image having a same size as the input image; and
   obtain the inpainting result based on the preliminary inpainting result and the noise image.

9. The apparatus according to claim 1, wherein the image inpainting module is further configured to process an object map by at least one of randomly exchanging element values of element points in adjacent locations in the object map, and randomly adjusting the element values of the element points in the object map,
   wherein the object map comprises at least one of the fusion feature map and the inpainting result.

10. The apparatus according to claim 9, wherein the randomly exchanging comprises:
  performing a first edge clipping on the object map to obtain a first clipped map and a second edge clipping on the object map to obtain a second clipped map;
  generating a first weight map corresponding to the first clipped map and a second weight map corresponding to the second clipped map, wherein element values of element points in the first weight map and the second weight map are one of 1 or 0, and wherein a first element value of a first element point at a first position of the first weight map is different from a second element value of a second element point at a second position of the second weight map corresponding to the first position; and
  fusing the first clipped map and the second clipped map based on the first weight map and the second weight map to obtain a processed map having a same size as the object map.

11. The apparatus according to claim 9, wherein the randomly adjusting comprises:
  performing a third edge clipping on the object map to obtain a third clipped map and a fourth edge clipping on the object map to obtain a fourth clipped map;
  performing feature extraction based on the third clipped map to obtain an adjustment coefficient of the fourth clipped map; and
  adjusting element values of element points in the fourth clipped map based on the adjustment coefficient to obtain a processed object map with the same size as the object map.

12. The apparatus according to claim 1, wherein the image acquisition module is further configured to:
  acquire an original image including the object region;
  extract image features of the original image; and
  perform clipping on the original image based on the image features of the original image to obtain the input image including the object region.

13. The apparatus according to claim 12, wherein the image acquisition module is further configured to:
  determine a region size of the object region;
  based on the region size being smaller than or equal to a threshold size, obtain candidate regions having a first set region size according to the image features of the original image and location information of the object region;
  based on the region size being larger than the threshold size, obtain candidate regions having a second set region size according to the image features of the original image and the location information of the object region;
  screen the object region from candidate regions; and
  based on the screened object region being a candidate region having the second set region size, clip the original image according to the screened object region to obtain a clipped image having the second set region size, and scaling the clipped image according to the first set region size to obtain the input image, and
  wherein the image inpainting module is further configured to:
  scale the inpainting result to obtain a scaled inpainting result having the second set region size; and
  fuse the scaled inpainting result and the original image to obtain an inpainting result corresponding to the original image.

14. An image processing method, comprising:
  acquiring an input image including an object region;
  generating a mask image based on the input image;
  extracting a fusion feature map corresponding to the input image through an encoding network according to the input image and the mask image; and
  inpainting the object region in the input image using a decoding network based on the fusion feature map to obtain an inpainting result,
  wherein at least one of the encoding network and the decoding network comprises at least one depth-gated convolution processor.

15. The method according to claim 14, wherein the encoding network and the decoding network comprise at least one first convolution processor,
  wherein the at least one first convolution processor performs convolution according to an input fusion feature map and outputs the fusion feature map obtained by the convolution.

16. The method according to claim 14, wherein the inpainting comprises:
  obtaining a preliminary inpainting result based on the input image and the mask image;
  generating a noise image having a same size as the input image; and
  obtaining the inpainting result based on the preliminary inpainting result and the noise image.

17. The method according to claim 14, wherein the method further comprises processing an object map by at least one of: randomly exchanging element values of element points in adjacent locations in the object map, and randomly adjusting the element values of the element points in the object map, and
  wherein the object map comprises at least one of the fusion feature map and the inpainting result.

18. The method according to claim 14, wherein the acquiring the input image comprises:
  acquiring an original image including the object region;
  extracting image features of the original image; and
  performing clipping on the original image based on the image features of the original image to obtain the input image including the object region.

19. The method according to claim 18, wherein the clipping comprises:
  determining a region size of the object region;
  based on the region size being smaller than or equal to a threshold size, obtaining candidate regions having a first set region size according to the image features of the original image and location information of the object region;
  based on the region size being larger than the threshold size, obtaining candidate regions having a second set region size according to the image features of the original image and the location information of the object region;
  screening the object region from candidate regions; and
  based on the screened object region being a candidate region having the second set region size, clipping the original image according to the screened object region to obtain a clipped image having the second set region size, and scaling the clipped image according to the first set region size to obtain the input image, and
  wherein after the obtaining the inpainting result, the method further comprises:
  scaling the inpainting result to obtain a scaled inpainting result having the second set region size; and fusing the scaled inpainting result and the original image to obtain an inpainting result corresponding to the original image.

20. A non-transitory computer readable storage medium configured to store instructions which, when executed by at least one processor, cause the at least one processor to:
acquire an input image including an object region;
generate a mask image based on the input image;
extract a fusion feature map corresponding to the input image using an encoding network according to the input image and the mask image; and
inpaint the object region in the input image using a decoding network based on the fusion feature map, to obtain an inpainting result,
wherein at least one of the encoding network and the decoding network comprises at least one depth-gated convolution processor.

* * * * *